US010488857B2

United States Patent
Duffley et al.

(10) Patent No.: US 10,488,857 B2
(45) Date of Patent: Nov. 26, 2019

(54) ENVIRONMENTAL MANAGEMENT SYSTEMS INCLUDING MOBILE ROBOTS AND METHODS USING SAME

(71) Applicant: iRobot Corporation, Bedford, MA (US)

(72) Inventors: Samuel Duffley, Cambridge, MA (US); Jeffrey W. Mammen, Westford, MA (US); Michael J. Halloran, Bedford, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 15/174,292

(22) Filed: Jun. 6, 2016

(65) Prior Publication Data

US 2016/0282862 A1     Sep. 29, 2016

Related U.S. Application Data

(62) Division of application No. 14/046,940, filed on Oct. 5, 2013, now Pat. No. 9,380,922.

(Continued)

(51) Int. Cl.
*G05D 1/00* (2006.01)
*A47L 9/28* (2006.01)
*A47L 11/40* (2006.01)

(52) U.S. Cl.
CPC .......... *G05D 1/0016* (2013.01); *A47L 9/2857* (2013.01); *A47L 11/4011* (2013.01); *A47L 2201/00* (2013.01); *G05D 2201/0203* (2013.01)

(58) Field of Classification Search
CPC .......................... G05D 1/0011; G05D 1/0016
See application file for complete search history.

(56) References Cited

U.S. PATENT DOCUMENTS 5,942,869 A    8/1999   Katou et al.
6,389,329 B1   5/2002   Colens
(Continued)

FOREIGN PATENT DOCUMENTS

EP    2 381 328 A2    10/2011
EP    2 508 957 A2    10/2012
(Continued)

OTHER PUBLICATIONS

Antalóczy, Tibor, LG Hom-bot 2.0 demo at CES 2012, Jan. 13, 2012, Robot Buying Guide, Accessed Jun. 4, 2015, http://robotbg.com/news/2012/01/14/Ig_hom_bot_20_demo_at_ces_2012, 3 pages.
(Continued)

*Primary Examiner* — Ryan Rink
(74) *Attorney, Agent, or Firm* — Schwegman Lundberg & Woessner, P.A.

(57) ABSTRACT

A computer-implemented method for receiving user commands for a remote cleaning robot and sending the user commands to the remote cleaning robot, the remote cleaning robot including a drive motor and a cleaning motor, includes displaying a user interface including a control area, and within the control area: a user-manipulable launch control group including a plurality of control elements, the launch control group having a deferred launch control state and an immediate launch control state; at least one user-manipulable cleaning strategy control element having a primary cleaning strategy control state and an alternative cleaning strategy control state; and a physical recall control group including a plurality of control elements, the physical recall control group having an immediate recall control state and a remote audible locator control state. The method further includes: receiving user input via the user-manipulable control elements; responsive to the user inputs, displaying simultaneously within the same control area a real-time (Continued)

robot state reflecting a unique combination of control states; and commanding the remote cleaning robot to actuate the drive motor and cleaning motor to clean a surface based on the received input and unique combination of control states.

33 Claims, 13 Drawing Sheets

Related U.S. Application Data

(60) Provisional application No. 61/772,940, filed on Mar. 5, 2013, provisional application No. 61/754,319, filed on Jan. 18, 2013.

(56) References Cited

U.S. PATENT DOCUMENTS

| | | | |
|---|---|---|---|
| 6,532,404 B2 | 3/2003 | Colens | |
| 6,594,844 B2 | 7/2003 | Jones | |
| 6,658,325 B2 | 12/2003 | Zweig | |
| 6,690,134 B1 | 2/2004 | Jones et al. | |
| 6,781,338 B2 | 8/2004 | Jones et al. | |
| 6,809,490 B2 | 10/2004 | Jones et al. | |
| 6,909,921 B1* | 6/2005 | Bilger | G05B 15/02 700/14 |
| 6,965,209 B2 | 11/2005 | Jones et al. | |
| 7,024,278 B2 | 4/2006 | Chiappetta et al. | |
| 7,155,308 B2 | 12/2006 | Jones | |
| 7,173,391 B2 | 2/2007 | Jones et al. | |
| 7,196,487 B2 | 3/2007 | Jones et al. | |
| 7,332,890 B2 | 2/2008 | Cohen et al. | |
| 7,388,343 B2 | 6/2008 | Jones et al. | |
| 7,389,156 B2 | 6/2008 | Ziegler et al. | |
| 7,448,113 B2 | 11/2008 | Jones et al. | |
| 7,571,511 B2 | 8/2009 | Jones et al. | |
| 7,636,982 B2 | 12/2009 | Jones et al. | |
| 7,761,954 B2 | 7/2010 | Ziegler et al. | |
| 7,769,492 B2 | 8/2010 | Wang et al. | |
| 8,364,309 B1 | 1/2013 | Bailey | |
| 8,374,421 B1* | 2/2013 | Hickman | B25J 9/1697 318/568.12 |
| 8,438,695 B2* | 5/2013 | Gilbert, Jr. | A47L 11/34 15/319 |
| 8,510,255 B2 | 8/2013 | Fadell et al. | |
| 8,528,157 B2* | 9/2013 | Schnittman | A47L 9/106 15/3 |
| 8,639,644 B1 | 1/2014 | Hickman et al. | |
| 8,798,834 B2* | 8/2014 | Jeong | H02J 7/0004 701/22 |
| 8,903,590 B2* | 12/2014 | Jeon | A47L 9/009 701/25 |
| 9,008,835 B2 | 4/2015 | Dubrovsky et al. | |
| 2002/0016649 A1 | 2/2002 | Jones | |
| 2002/0120364 A1 | 8/2002 | Colens | |
| 2002/0173877 A1 | 11/2002 | Zweig | |
| 2003/0025472 A1 | 2/2003 | Jones et al. | |
| 2003/0184436 A1* | 10/2003 | Seales | G08B 25/016 340/531 |
| 2004/0020000 A1 | 2/2004 | Jones | |
| 2004/0049877 A1 | 3/2004 | Jones et al. | |
| 2004/0113777 A1* | 6/2004 | Matsuhira | G08B 13/19645 340/541 |
| 2004/0158357 A1 | 8/2004 | Lee et al. | |
| 2004/0187457 A1 | 9/2004 | Colens | |
| 2004/0207355 A1 | 10/2004 | Jones et al. | |
| 2005/0010331 A1 | 1/2005 | Taylor et al. | |
| 2005/0067994 A1 | 3/2005 | Jones et al. | |
| 2005/0171636 A1 | 8/2005 | Tani | |
| 2005/0204717 A1 | 9/2005 | Colens | |
| 2006/0095158 A1 | 5/2006 | Lee et al. | |
| 2006/0287801 A1 | 12/2006 | Im | |
| 2006/0293788 A1* | 12/2006 | Pogodin | G05D 1/0011 700/245 |
| 2007/0192910 A1 | 8/2007 | Vu et al. | |
| 2007/0250212 A1 | 10/2007 | Halloran et al. | |
| 2007/0266508 A1 | 11/2007 | Jones et al. | |
| 2008/0140255 A1 | 6/2008 | Ziegler et al. | |
| 2008/0155768 A1 | 7/2008 | Ziegler et al. | |
| 2008/0307590 A1 | 12/2008 | Jones et al. | |
| 2008/0311878 A1* | 12/2008 | Martin | G08B 25/08 455/404.1 |
| 2009/0037033 A1 | 2/2009 | Phillips et al. | |
| 2009/0082879 A1* | 3/2009 | Dooley | B25J 9/1658 700/3 |
| 2009/0281661 A1 | 11/2009 | Dooley et al. | |
| 2009/0303042 A1* | 12/2009 | Song | G08B 13/19647 340/566 |
| 2009/0306822 A1* | 12/2009 | Augenbraun | A47L 5/225 700/245 |
| 2010/0049365 A1 | 2/2010 | Jones et al. | |
| 2010/0082193 A1* | 4/2010 | Chiappetta | G05D 1/0225 701/24 |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2011/0077802 A1 | 3/2011 | Halloran et al. | |
| 2011/0194413 A1 | 8/2011 | Radunovic et al. | |
| 2011/0264305 A1 | 10/2011 | Choe et al. | |
| 2012/0066168 A1* | 3/2012 | Fadell | G05B 15/02 706/52 |
| 2012/0125363 A1 | 5/2012 | Kim et al. | |
| 2012/0229660 A1 | 9/2012 | Matthews et al. | |
| 2012/0256009 A1 | 10/2012 | Mucignat et al. | |
| 2012/0259481 A1 | 10/2012 | Kim | |
| 2012/0265370 A1 | 10/2012 | Kim et al. | |
| 2012/0310463 A1 | 12/2012 | Jeong et al. | |
| 2012/0323365 A1 | 12/2012 | Taylor et al. | |
| 2013/0056032 A1 | 3/2013 | Choe et al. | |
| 2013/0060379 A1 | 3/2013 | Choe et al. | |
| 2013/0206177 A1* | 8/2013 | Burlutskiy | A47L 9/009 134/18 |
| 2014/0100736 A1* | 4/2014 | Kim | G05D 1/0219 701/26 |
| 2014/0167931 A1 | 6/2014 | Lee et al. | |
| 2015/0230100 A1 | 8/2015 | Atia et al. | |
| 2016/0000289 A1 | 1/2016 | Senoo et al. | |

FOREIGN PATENT DOCUMENTS

| | | |
|---|---|---|
| EP | 2 511 782 A2 | 10/2012 |
| JP | 2000-342497 | 12/2000 |
| JP | 2002-085305 A | 3/2002 |
| JP | 2004-350801 | 12/2004 |
| JP | 2005-211498 A | 8/2005 |
| JP | 2005-331128 | 12/2005 |
| JP | 2009088995 A | 4/2009 |
| JP | 2010-017428 | 1/2010 |
| JP | 2010-198064 | 9/2010 |
| JP | 2012-190073 | 10/2012 |
| KR | 10-2006-0078099 A | 7/2006 |
| KR | 10-0645379 B1 | 11/2006 |
| KR | 10-2008-0052029 A | 6/2008 |
| KR | 10-2009-0012542 A | 2/2009 |
| KR | 10-2009-0036766 A | 4/2009 |
| KR | 10-2012-0114671 A | 10/2012 |
| KR | 10-2012-0126772 A | 11/2012 |
| WO | WO 2012/142225 A1 | 10/2012 |

OTHER PUBLICATIONS

International Search Report and Written Opinion Corresponding to International Application No. PCT/US2014/012110; dated May 9, 2014, 15 pages.

International Search Report and Written Opinion Corresponding to International Application No. PCT/US2014/012368; dated May 20, 2014, 18 pages.

International Search Report and the Written Opinion of the International Searching Authority, or the Declaration, in corresponding PCT Application No. PCT/US2013/063598, dated Jan. 24, 2014, 14 pages.

(56) References Cited

OTHER PUBLICATIONS

"LG Smart Appliances for 2012 Deliver Connectivity, Efficiency Through Smart Thinq™ Technologies", Press release, Jan. 9, 2012, 8 pages.
Nathan, Mike, Hackaday, Roomba used to map indoor air quality, Jul. 20, 2011, Retrieved from the internet at URL http://hackaday.com/2011/07/20/roomba-used-to-map-indoor-air-quality/, 1 page.
Notification Concerning Transmittal of International Preliminary Report on Patentability in corresponding PCT Application No. PCT/US2013/063598, dated Jul. 30, 2015, 10 pages.
Notification Concerning Transmittal of International Preliminary Report on Patentability in corresponding PCT Application No. PCT/US2014/012110, dated Jul. 30, 2015, 10 pages.
Notification Concerning Transmittal of International Preliminary Report on Patentability in corresponding PCT Application No. PCT/US2014/012368, dated Jul. 30, 2015, 14 pages.
Pratt, Brian, Roomote iPhone App YouTube video, uploaded Mar. 24, 2010, Accessed Jun. 4, 2015, https://youtu.be/Jd-yYoZcXJw, 1 page.
St. John, Jeff, Greentech Media, The IPv6-Addressable Light Bulb Goes on Sale, Oct. 22, 2012, Retrieved from the internet at URL http://www.greentechmedia.com/articles/read/the-ipv6-addressable-light-bulb-goes-on-sale, 4 pages.
Extended European Search Report Corresponding to European Application No. 13871603.0, dated Aug. 1, 2016, 7 Pages.
Extended European Search Report Corresponding to European Application No. 14740799.3, dated Aug. 3, 2016, 23 Pages.
Japanese Office Action Corresponding to Japanese Patent Application No. 2015-553718 (Foreign Text, 4 Pages, English Translation Thereof, 4 Pages) (dated Oct. 27, 2017).
Examination Report corresponding to Australian Application No. 2017200992 (3 pages) (dated Feb. 15, 2018).
Japanese Office Action corresponding to Japanese Application No. 2015-553900 (3 Pages) (dated Feb. 20, 2018).

* cited by examiner

ENVIRONMENTAL MANAGEMENT SYSTEMS INCLUDING MOBILE ROBOTS AND METHODS USING SAME

RELATED APPLICATION(S)

The present application is a divisional application of and claims priority from U.S. patent application Ser. No. 14/046,940, filed Oct. 5, 2013, which claims the benefit of and priority from U.S. Provisional Patent Application No. 61/754,319, filed Jan. 18, 2013, and U.S. Provisional Patent Application No. 61/772,940, filed Mar. 5, 2013, the disclosures of which are incorporated herein by reference in their entireties.

FIELD OF THE INVENTION

The present invention relates to mobile robots and, more particularly, to systems and methods including the same.

BACKGROUND OF THE INVENTION

Connectivity (i.e., wireless connection to the Internet and remote clients) has been contemplated for household appliances for some time.

Recently, the term "Internet of Things" has come to represent the idea that household articles of all kinds can be connected to the public Internet. Once connected, such articles can report various data to server and client devices. For example, one idea is to connect 'smart' light bulbs to household WAN (Wireless Area Network). Each light bulb would have a microprocessor, memory, some means of detecting or interpreting status, power, and a wireless connection. Using these components, the light bulb can report its status, can be polled, etc.

The concept is broad, and generally is only distinct from household connectivity in general (e.g., computers, cable boxes, media devices, and the like) in that the Internet of Things articles are not normally considered to include sufficient computing resources or communications to meaningfully connect to the public internet. A conventional refrigerator would not connect to the internet; the same device as an "Internet of Things" article would include computational, sensor, and communications hardware and sufficient software to become an entity addressable remotely and locally; the expectation being that this Internet Fridge could report its various states (power consumption or the like) and respond to remote commands (increase or decrease internal temperature).

Household mobile robots may also become "Internet of Things" articles. In some ways, household mobile robots are a distinct species within this set—generally, speaking, the autonomy of the household mobile robot sets it apart from other appliances. No other appliance performs in an unpredictable and variable environment. No other appliance makes a multiplicity of autonomous decisions based on tens or hundreds of sensor inputs in order to achieve mission completion.

A dishwasher—even an Internet of Things dishwasher—does not know anything about is contents and runs the equivalent of simple scripts controlling motors and pumps, potentially interrupted by simple clog or other sensors. An iRobot Roomba vacuuming robot, during the course of its mission, may detect its own state in numerous ways, and may flexibly escape from challenging situations in the household, as well as engage in predictive and planning activities.

There exist many unmet challenges in the integration of the rich and autonomous behavior of a household mobile robot with the core concepts of "Internet of Things" connectivity.

SUMMARY OF EMBODIMENTS OF THE INVENTION

According embodiments of the present invention or according to the invention, a computer-implemented method for receiving user commands for a remote cleaning robot and sending the user commands to the remote cleaning robot, the remote cleaning robot including a drive motor and a cleaning motor, includes displaying a user interface including a control area, and within the control area: a user-manipulable launch control group including a plurality of control elements, the launch control group having a deferred launch control state and an immediate launch control state; at least one user-manipulable cleaning strategy control element having a primary cleaning strategy control state and an alternative cleaning strategy control state; and a physical recall control group including a plurality of control elements, the physical recall control group having an immediate recall control state and a remote audible locator control state. The method further includes: receiving user input via the user-manipulable control elements; responsive to the user inputs, displaying simultaneously within the same control area a real-time robot state reflecting a unique combination of control states; and commanding the remote cleaning robot to actuate the drive motor and cleaning motor to clean a surface based on the received input and unique combination of control states.

In some embodiments, or in the invention, the method includes displaying in the control area a scheduling control group including a plurality of scheduling control elements that are user-manipulable to schedule and initiate a deferred launch of the remote cleaning robot to clean the surface.

According to some embodiments or according to the invention, the user interface is provided on a user terminal, and when the immediate recall control state is entered, the user terminal transmits a command to the remote cleaning robot to return to a dock.

In some embodiments or in the invention, the user interface is provided on a user terminal, and when the remote audible locator control state is entered, the user terminal transmits a command to the remote cleaning robot to emit an audible signal from a transducer forming a part of the remote cleaning robot.

The method may include: receiving an alert signal at a user terminal indicating that the remote cleaning robot is unable to execute a user command; and in response to the alert signal, displaying an alert within the control area indicating that the remote cleaning robot is unable to execute the user command. The method may further include displaying in the control area one or more remediation control elements. In some embodiments, or in the invention, the one or more remediation control elements includes a beacon control element and, in response to actuation of the beacon control element, the user terminal transmits a command to the remote cleaning robot to emit an audible signal from a transducer forming a part of the remote cleaning robot. In some embodiments, or in the invention, the one or more remediation control elements includes an escape maneuver control element and, in response to actuation of the escape maneuver control element, the user terminal transmits a command to the remote cleaning robot to execute a prescribed maneuver to attempt to become unstuck.

According to some embodiments, or according to the invention: the user interface is provided on a user terminal; the primary cleaning strategy control state is a deep cleaning strategy control state; the alternative cleaning strategy control state is a quick cleaning strategy control state; responsive to selection of the deep cleaning strategy control state, the user terminal commands the remote cleaning robot to execute a relatively higher cumulative energy cleaning strategy; and responsive to selection of the quick cleaning strategy control state, the user terminal commands the remote cleaning robot to execute a relatively lower cumulative energy cleaning strategy. In some embodiments, or in the invention, the method includes: displaying a graphical representation of an area to be cleaned by the remote cleaning robot; displaying at least one cleaning control strategy element; receiving user input via the at least one cleaning control strategy element indicating different cleaning strategies for different subsections of the graphical representation of the area to be cleaned by the remote cleaning robot; and commanding the remote cleaning robot to clean corresponding subsections of the surface in accordance with the user inputs.

The method may include displaying in the control area an operational message to the user.

According to some embodiments, or according to the invention, the user interface is provided on a user handheld mobile wireless communication terminal.

According to embodiments of the present invention, or according to the invention, a computer program product for receiving user commands for a remote cleaning robot and sending the user commands to the remote cleaning robot, the remote cleaning robot including a drive motor and a cleaning motor, includes a non-transitory computer readable storage medium having computer readable code embodied in the medium. The computer readable code includes computer readable code configured to display a user interface including a control area, and within the control area: a user-manipulable launch control group including a plurality of control elements, the launch control group having a deferred launch control state and an immediate launch control state; at least one user-manipulable cleaning strategy control element having a primary cleaning strategy control state and an alternative cleaning strategy control state; and a physical recall control group including a plurality of control elements, the physical recall control group having an immediate recall control state and a remote audible locator control state. The computer readable code is further configured to: receive user input via the user-manipulable control elements; responsive to the user inputs, display simultaneously within the same control area a real-time robot state reflecting a unique combination of control states; and command the remote cleaning robot to actuate the drive motor and cleaning motor to clean a surface based on the received input and unique combination of control states.

According to embodiments of the present invention or according to the invention, a system for monitoring and controlling mobile robot status in a living space of a structure includes a remote cleaning robot and a user terminal. The remote cleaning robot includes a drive motor and a cleaning motor. The user terminal is remote from the remote cleaning robot and has a display. The user terminal is operable to display a user interface including a control area, and within the control area: a user-manipulable launch control group including a plurality of control elements, the launch control group having a deferred launch control state and an immediate launch control state; at least one user-manipulable cleaning strategy control element having a primary cleaning strategy control state and an alternative cleaning strategy control state; and a physical recall control group including a plurality of control elements, the physical recall control group having an immediate recall control state and a remote audible locator control state. The user terminal is further operable to: receive user input via the user-manipulable control elements; responsive to the user inputs, display simultaneously within the same control area a real-time robot state reflecting a unique combination of control states; and command the remote cleaning robot to actuate the drive motor and cleaning motor to clean a surface based on the received input and unique combination of control states.

According to embodiments of the present invention or according to the invention, an environmental management system for monitoring conditions in a living space of a structure includes a hub, a stationary sensor, and a mobile robot. The stationary sensor is positioned in the structure to monitor a condition in the living space and is operative to transmit corresponding stationary sensor data to the hub. The mobile robot is configured to move about the living space. The mobile robot includes an onboard robot sensor to monitor a condition in the living space and is operative to wirelessly transmit corresponding robot sensor data to the hub.

According to method embodiments of the present invention, or according to the invention, a method for monitoring conditions in a living space of a structure using a hub, a stationary sensor positioned in the structure, and a mobile robot configured to move about the living space and including an onboard robot sensor includes: monitoring a condition in the living space using the stationary sensor and transmitting corresponding stationary sensor data to the hub from the stationary sensor; and monitoring a condition in the living space using the onboard robot sensor and wirelessly transmitting corresponding robot sensor data to the hub from the mobile robot.

According to embodiments of the present invention, or according to the invention, a system for monitoring and controlling mobile robot status in a living space of a structure includes a hub, a mobile robot, and a mobile device. The hub is in communication with a network. The mobile robot is in communication with the hub. The mobile robot is configured to move about the living space. The mobile robot includes an onboard robot sensor to monitor a condition in the living space and is operative to wirelessly transmit corresponding robot sensor data to the hub. The mobile device is in communication with the network. The mobile device includes an interactive application for controlling or monitoring the state of the mobile robot. Controlling the mobile robot includes providing one or more selectable scheduling parameters or action commands. Monitoring the state of the mobile robot includes providing a display of area coverage completion.

According to embodiments of the present invention, or according to the invention, a computer program product for monitoring and controlling mobile robot status in a living space of a structure, the mobile robot in being in communication with a hub, configured to move about the living space, and including an onboard robot sensor to monitor a condition in the living space and operative to wirelessly transmit corresponding robot sensor data to the hub, includes a non-transitory computer readable storage medium having computer readable code embodied in the medium. The computer readable code includes computer readable code to control or monitor the state of the mobile robot. Controlling the mobile robot includes providing one or more selectable scheduling parameters or action commands. Monitoring the state of the mobile robot includes providing a display of area coverage completion.

Further features, advantages and details of the present invention will be appreciated by those of ordinary skill in the art from a reading of the figures and the detailed description of the embodiments that follow, such description being merely illustrative of the present invention.

DETAILED DESCRIPTION OF EMBODIMENTS OF THE INVENTION

Figure 1:
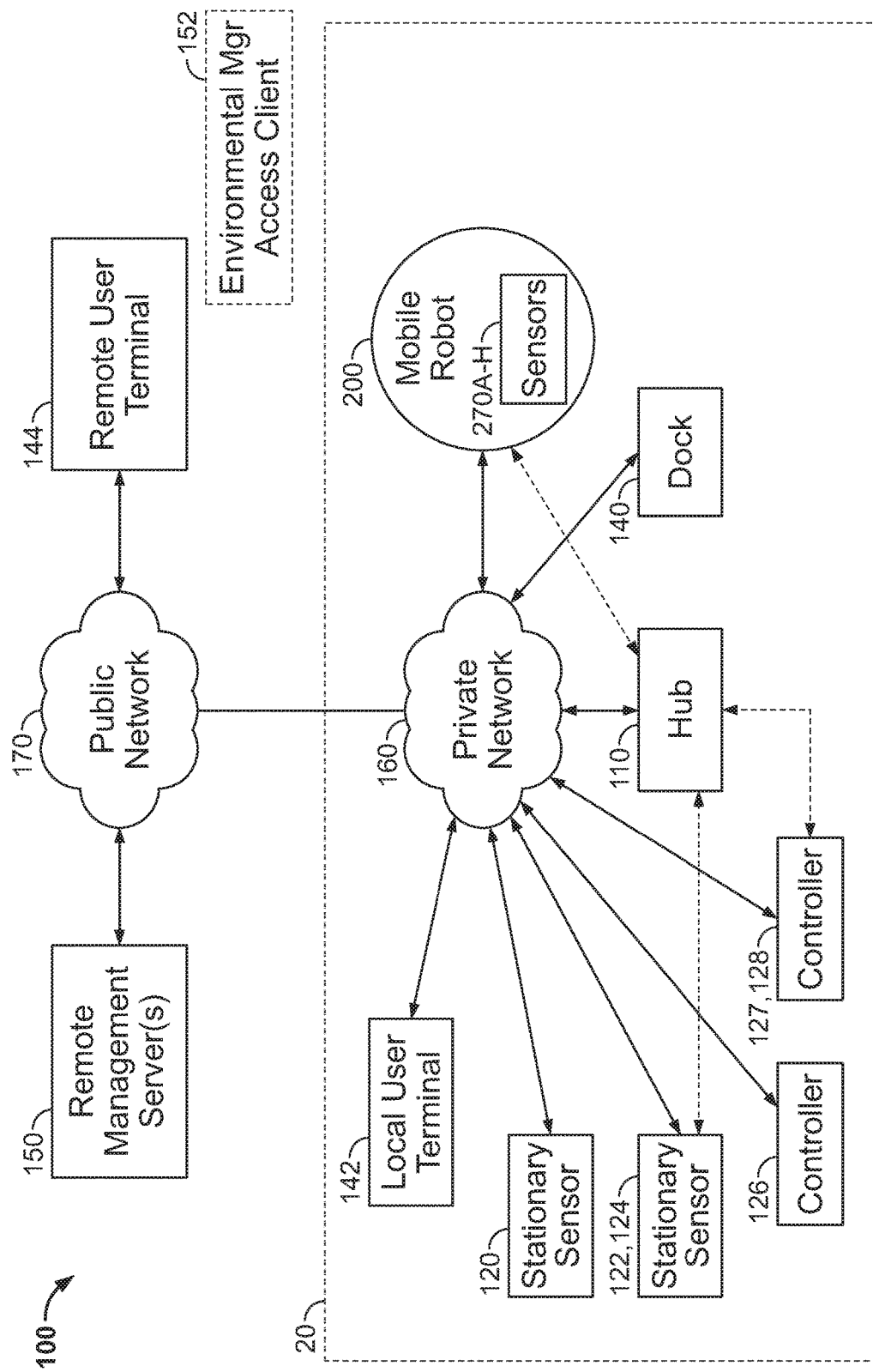
FIG. 1 is a schematic diagram representing an environmental management system according to embodiments of the present invention, or according to the invention.
Figure 2:
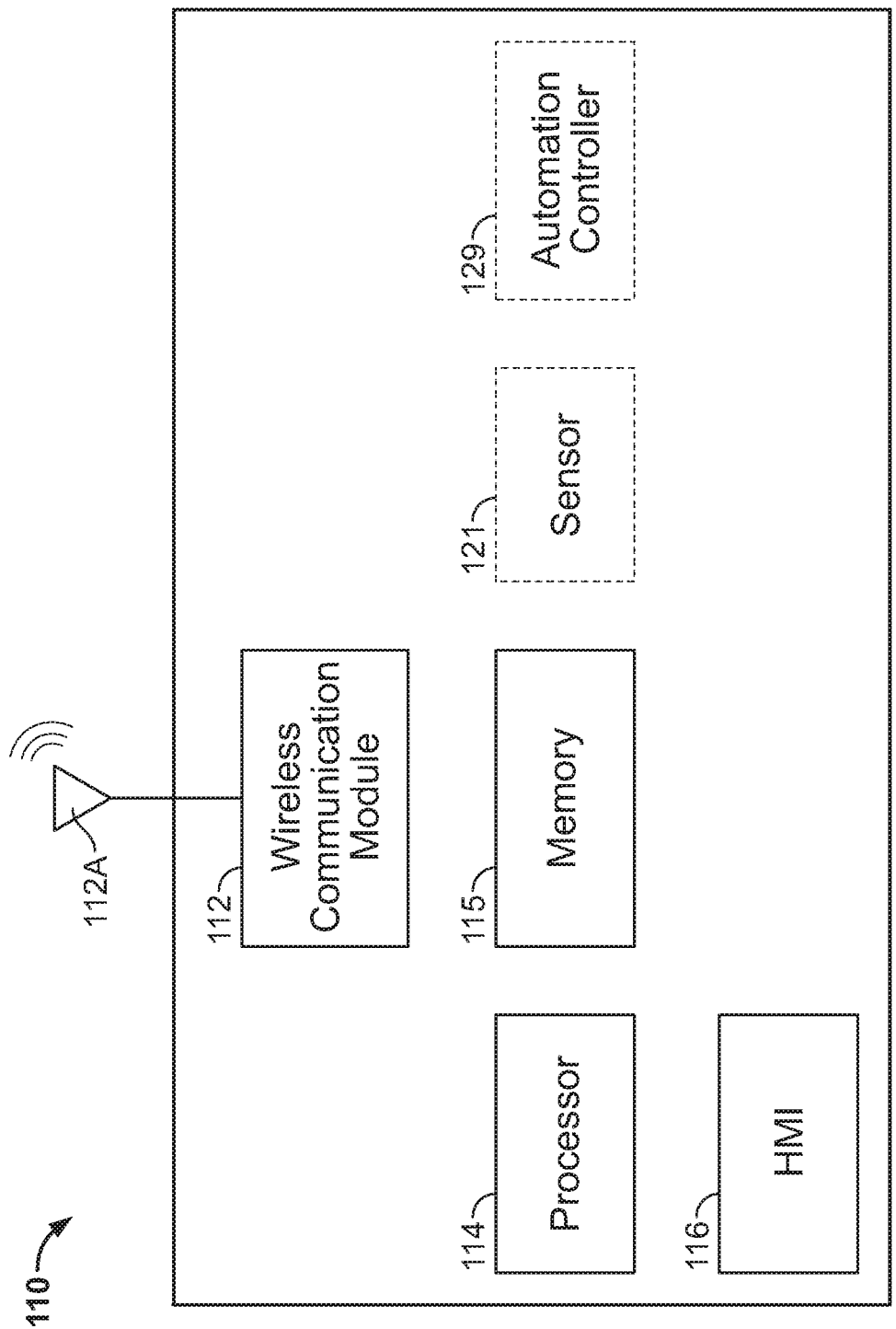
FIG. 2 is a schematic diagram representing a hub forming a part of the environmental management system of FIG. 1.

According to embodiments of the present invention, or according to the invention, an environmental management system including a mobile robot is provided for use in monitoring conditions in a living space. In some embodiments, or in the invention, the environmental management system is used for controlling conditions in the living space and/or evaluating and generating recommendations or plans for addressing conditions in the living space. In some embodiments, or in the invention, the mobile robot has one or more environmental sensors to collect information from the living space. In some embodiments, or in the invention, the environmental management system also includes one or more stationary sensors not mounted on the mobile robot and these stationary sensors are used to monitor the living space to collect data that is used in controlling operation of the mobile robot in the living space.

With reference to FIGS. 1-4, an environmental management system 100 according to embodiments of the invention or according to the invention is shown therein installed in an associated enclosure or living structure 10. The structure 10 may be a home or residential dwelling (e.g., a single family home, multi-family dwelling (e.g., a unit of a duplex, apartment, condominium, etc.), or mobile home) or a commercial living space (e.g., an office or studio). The structure 10 defines an enclosure space 20, which may be subdivided (physically, spatially and/or functionally) into two or more defined zones (e.g., zones A-C). The structure 10 has windows 30, a door 32, light fixtures 34 (having exhaustable lamps 34A), a TV 36 (or other electronic equipment), and a heating, ventilation and air conditioning system (HVAC) 40. A person P may occupy the enclosure space 20.

Figure 4:
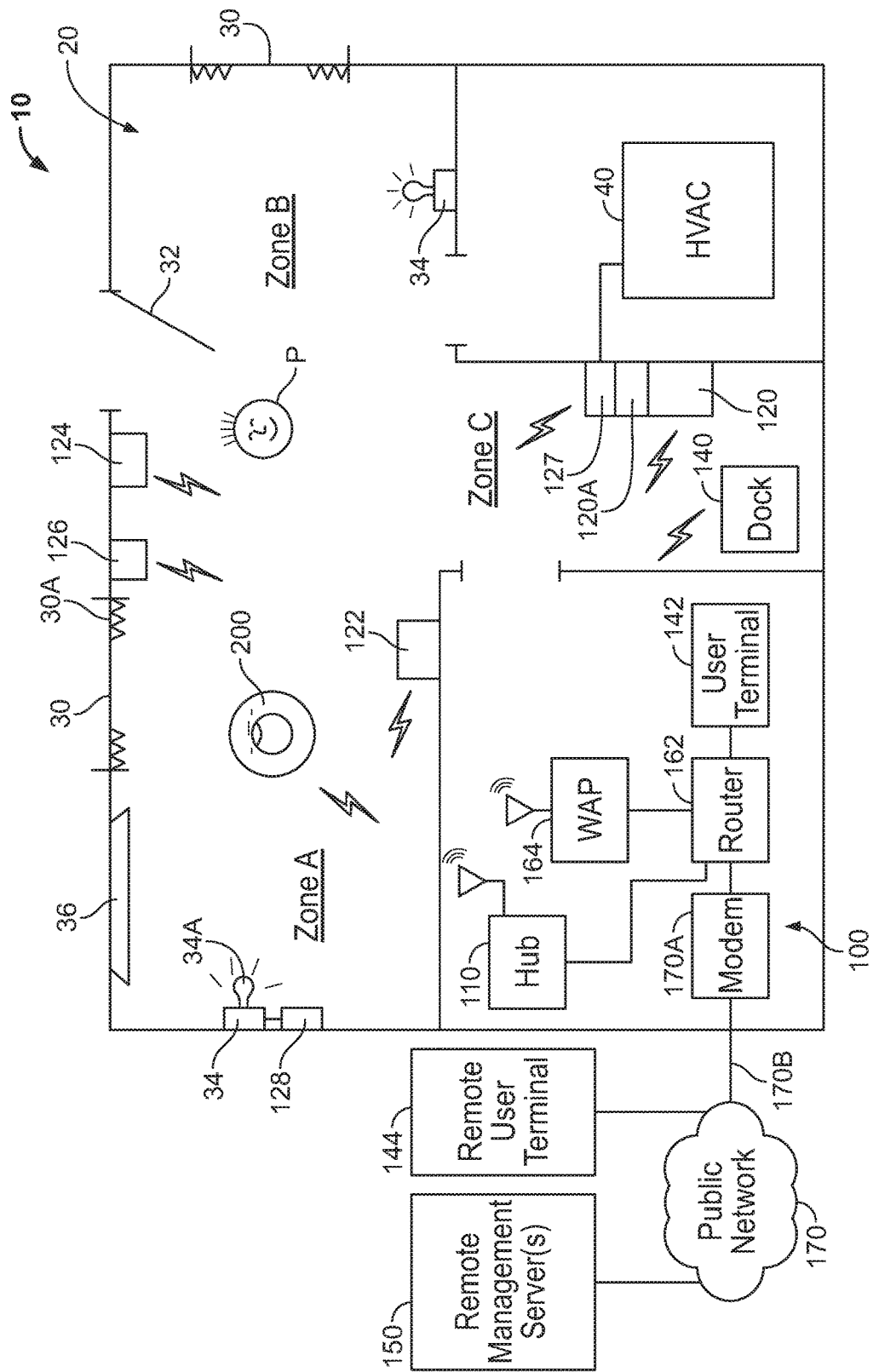
FIG. 4 is a schematic diagram illustrating a living structure with the environmental management system of FIG. 1 installed therein.

With reference to FIGS. 1 and 4, the environmental management system 100 includes a networked-enabled mobile robot 200, a networked-enabled environmental management system hub 110, networked-enabled stationary sensors 120, 122, 124, networked-enabled automation controller devices 126, 127, 128, a robot dock 140, a private network (e.g., a broadband LAN) 160, and a remote management server or servers (e.g., cloud server) 150. The private network 160 is enabled by a router 162 and a broadband wireless access point (WAP) 164. The private network 160 is connected to the remote server 150 by a WAN or public network 170 (e.g., the Internet) through a gateway 170A (e.g., a broadband modem) and an external connection 170B (e.g., an ISP). The router 162, the WAP 164 and/or the modem 170A may be integrated in a single device. A local user terminal 142 (e.g., a PC, smartphone, or tablet computer) may be connected (wired or wirelessly) to the private network 160. A remote user terminal 144 may be connected to the remote server 150 and/or the private network 160 via the public network 170. The hub 110, the robot 200, the local user terminal 140 and the remote user terminal 144 may each be configured with an environmental manager access client 152 (e.g., downloadable or pre-installed application software app) enabling communications and control between the nodes 110, 200, 140, 142, 144 and 150 as described herein. The access client 152 may provide a convenient interface for a user.

The hub 110 (FIG. 2) may be any suitable device configured to provide the functionality described herein. In some embodiments, or in the invention, the hub 110 includes a processor 114, memory 115, an HMI 116, a wireless communications module (e.g., a Wi-Fi module) 112, and an associated antenna 112A. The hub 110 may include connection hardware (e.g., an ethernet connector) for wired connection to the router 162. In some embodiments, or in the invention, the hub 110 includes an integral environmental sensor 121 and/or an integral automation controller device 129. For example, in some embodiments, or in the invention, the hub 110 is a networked, intelligent, microprocessor controlled thermostat including an ambient temperature sensor and an HVAC controller integrated with a processor and, in some embodiments, a battery. Suitable hubs for the hub 110 may include the Iris Hub™ available from Lowe's Home Improvement, NEST™ intelligent thermostats available from NEST Labs of Palo Alto, Calif., and devices as disclosed in U.S. Published Application No. 2012/0256009 and U.S. Published Application No. 2012/0066168, the disclosures of which are incorporated herein by reference.

As illustrated, the hub 110 can be connected to the private network 160 by wiring to the router 162. Alternatively, the hub 110 may be wirelessly connected to the router 162 via the wireless module 112 and the WAP 164.

The stationary sensors 120, 122, 124 can be any suitable sensors operable to detect a physical condition or phenomena and convert the same to a corresponding data signal. For example, each sensor 120, 122, 124 may be a temperature sensor, contact sensor, acoustic sensor (e.g., microphone), motion sensor (e.g., passive IR motion sensor), pressure sensor, visible light sensor, or gas composition sensor. Each sensor 120, 122, 124 may include a wireless transmitter (narrowband or broadband/Wi-Fi) to communicate with the hub 110 and/or the private network 160 via the WAP 164. The sensors 120, 122, 124 are stationary in that they remain in one location (e.g., affixed to a wall of the structure 10) throughout the process of monitoring and controlling the environment of the living space 20. In contrast to the mobile robot 200, the stationary sensors 120, 122, 124 must be picked up and transported to relocate and typically will not be relocated at all (i.e., they will typically be permanently installed in a given location relative to the space 20). While three stationary sensors 120, 122, 124 are shown, the system 100 may include more or fewer.

The automation controller devices 126, 127, 128 may be any suitable devices operable to control operation of a device or system associated with the structure 10. Examples of automation controller devices include a thermostat to actuate/deactivate/adjust the HVAC system 40 (as illustrated, controller 127), a switch device to actuate/deactuate a light (as illustrated, controller 128), an audible alarm, a device operative to open and close a window covering (e.g., automatic shades) (as illustrated, controller 126), and an automatic latch or lock device. Each automation controller device 126, 127, 128 may include a wireless transmitter (narrowband or broadband Wi-Fi) to communicate with the hub 110 and/or private network 160 via the WAP 164. While three controller devices 126, 127, 128 are shown, more or fewer may be provided.

The robot dock 140 may include or be connected to a power supply and include a charger operative to charge a battery of the mobile robot 200 when the robot 200 is effectively docked at the robot dock 140. The dock 140 may include a receptacle to empty debris from the robot 200. In some embodiments, or in the invention, the dock 140 is connected (wired or wirelessly) to the private network 160 to enable or facilitate transmission of data from the robot 200 to the private network 160 and/or from the private network 160 to the robot 200.

Figure 3:
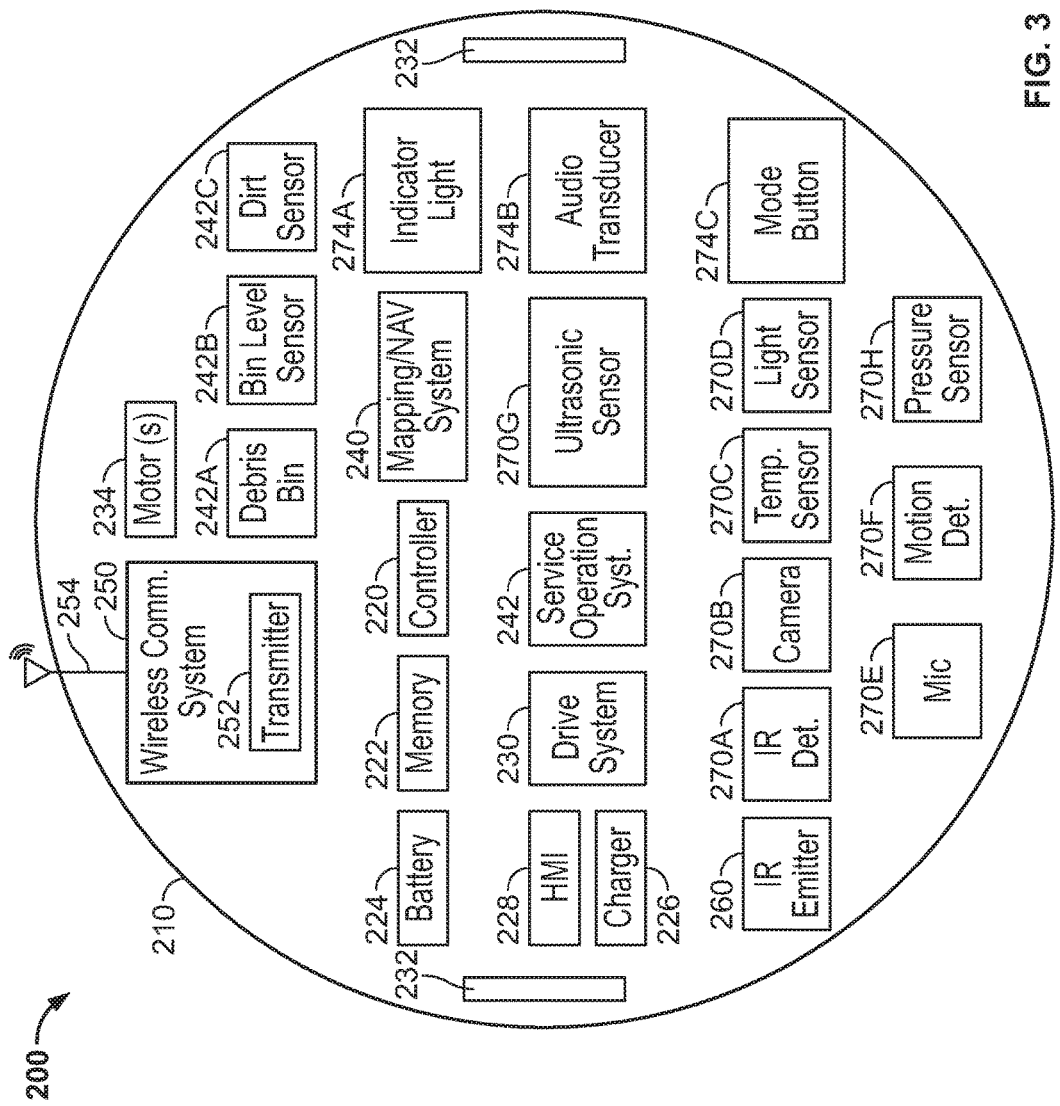
FIG. 3 is a schematic diagram representing a network-enabled mobile robot forming a part of the environmental management system of FIG. 1.

The mobile robot 200 may be any suitable robot and it will be appreciated that not all of the components, features and functionality described herein are required in all embodiments of the invention, or in the invention. With reference to FIG. 3, the exemplary mobile robot 200 includes a chassis 210, a controller 220, memory 222, a battery 224, a battery charger 226, a human-machine interface (HMI) 228, a drive system 230, a mapping/navigation system 240, a service operation system 242, a wireless communication system 250, an IR emitter 260, and environmental sensors 270A-H a debris bin 242A (to store debris collected by a cleaning operation), a bin level sensor 242B, a dirt extraction sensor 242C (to detect the density of characteristics of the debris collected by the cleaning operation), an indicator light 274A, an audio transducer 274B, and a cleaning mode selection switch (e.g., button) 274C. The mobile robot 200 may be generally configured in the manner of or include features from the Roomba™ floor cleaning robot and/or robots as described in U.S. Pat. No. 7,024,278 and U.S. Published Application No. 2007/0250212, the disclosures of which are incorporated herein by reference, with suitable modifications.

The controller 220 may include any suitably configured processor (e.g., microprocessor) or processors.

The drive system 230 may include any suitable mechanism or system for actively and controllably transiting the robot 200 through the enclosure space 20. According to some embodiments, or according to the invention, the drive system 230 includes a roller, rollers, track or tracks 232 and one or more onboard electric motors 234 operable by the controller 220 to convey the robot 200 across the floor of the enclosure space 20.

The service operation system 242 may be optional in some embodiments, or in the invention, and is operable to execute a service operation in the enclosure space 20. According to some embodiments, or according to the invention, the service operation system 242 includes a floor cleaning system that cleans a floor surface of the enclosure space 20 as the robot 200 transits through the space 20. In some embodiments, or in the invention, the service operation system 242 includes a suction head and an onboard vacuum generator to vacuum clean the floor. In some embodiments, or in the invention, the system 242 includes a sweeping or mopping mechanism.

The wireless communication system 250 includes a wireless communication transmitter or module 252 (e.g., a Wi-Fi module) and an associated antenna 254 to enable wireless communication between the robot 200 and the hub 110 and/or the private network 160 (i.e., via the WAP 164). Various different network configurations may be employed for the private network 160, of which the mobile robot 200 constitutes a node. In some embodiments, or in the invention, the robot 200 communicates wirelessly with the hub 110 through the router 162 via the WAP 164. In some embodiments, or in the invention, the mobile robot 200 communicates with the remote management server 150 via the router 162 and the WAP 164, bypassing the hub 110.

In some embodiments, or in the invention, the robot 200 may communicate wirelessly directly with the hub 110 using narrowband or broadband (e.g., Wi-Fi) RF communication. For example, if the robot 200 is not equipped with a transmitter compatible with the WAP 164, the robot 200 may communicate with the hub 110, which may in turn relay data from the robot 200 to the private network 160 or the remote management server 150. In some embodiments, or in the invention, the system 100 includes a network bridge device that receives and converts RF signals from the robot 200 and relays them to the router 162 in a format supported by the router for delivery to the remote management server 150 or another device in the private network 160. In some embodiments, or in the invention, the system 100 includes a low power mesh data network employing a mesh topology wherein RF communications signals are relayed from node to node between the mobile robot 200 and the hub 110. In this case, the stationary sensors 120, 122, 124, the controllers 124, 126, 127, 128, and range extender modules (if any; not shown) may serve as mesh nodes. Likewise, the mobile robot 200 may serve as a node to relay signals between the hub 110 and the other nodes (e.g., devices 120, 122, 124, 126, 127, 128 and range extenders).

The exemplary robot 200 includes the following environmental sensors: an IR radiation detector 270A, a camera 270B, an ambient temperature sensor 270C, an ambient light sensor 270D, an acoustic sensor 270E (e.g., microphone), a motion detector 270F (e.g., a passive IR photodiode), an ultrasonic sensor 270G, and a pressure sensor 270H. These sensors are not exhaustive of the types of sensors that may be provided on the robot 200 and certain of the sensors may be omitted depending on the environmental parameters to be detected by the robot 200.

The mapping/navigation system 240 can be used by the mobile robot 200 to map the enclosure space 20 and to determine or register the position of the robot 200 relative to the space 20 (i.e., to localize the robot 200 in the space 20). The robot 200 can thus also localize the locations of its onboard sensors 270A-H. Any suitable technique and components may be used to localize and register the robot 200, such as machine vision (e.g., using the camera 270B and Feature Recognition or Class Recognition software), light beacons, or radiofrequency received signal strength indicator (RSSI) technology.

According to some embodiments, or in according to the invention, the system 100 can uniquely identify rooms (e.g., Zone A, Zone B, Zone C) by combining (1) identity information (e.g., the IPv6 identity of an "Internet of Things" 6LowPan light bulb or socket transceiver, plug unit, or the like), (2) RSSI (e.g., the signal strength/amplitude of the same nearby IPv6 RF transceiver) and (3) remote control (e.g., the ability to modulate that RF transceiver via the local network or internet). For example, the autonomous robot 200 (e.g., a Roomba® robot) can navigate a room (e.g., Zone A, Zone B, or Zone C) until it finds a peak signal strength of an IPv6 transceiver, in which case it can be expected to be nearest this transceiver. It can then tag this transceiver with a topological or Cartesian location. Should the transceiver be associated with a room identity by an end user or automatically via any means (e.g., "living room light bulb No. 3"), the robot 200 can use this information in various ways. For example, the robot 200 may be commanded to clean the living room, in which case it can use its mobility and distance-dependent variation in signal strength to home on this room (even without a map). As another example, a robot 200 can be commanded to clean only the living room, in which case one or more transceivers known to be in the living room "anchor" the robot 200 to that room. The robot 200 sets a threshold for signal strength and/or rough localization using multiple signal sources and/or identifiable walls and doorways, and covers the room such that the signal strength of the living room IPv6 6LowPAN light bulb is high.

Further methods and operations in accordance with embodiments of the invention, or in accordance with the invention, and utilizing the environmental management system 100 will now be described.

According to some methods, the system 100 uses data from one or more of the networked stationary sensors 120, 122, 124 to control or enhance operation of the mobile robot 200. In some embodiments, or in the invention, the sensors 120, 122, 124, are occupancy sensors (e.g., passive IR motion detectors). When the sensors 122 detect a person P in a given zone A-C, the system 100 will cause the robot 200 to alter its operation to adapt to the occupancy. For example, the robot 200 may be executing a floor cleaning operation and the system 100 (e.g., via instructions from the hub 110 to the robot 200) may instruct the robot 200 to return to the dock 140, move to a different, unoccupied zone, avoid the occupied zone, or assume a quieter mode of operation. Similarly, before deploying the robot 200, the system 100 can use the stationary sensors 122 to determine whether an occupant is detectable and, if not, clear the robot 200 to proceed with a mission (e.g., a floor cleaning excursion). Alternatively, one or more of the onboard sensors 270A-H may detect occupancy and the robot 200 may communicate this information to the hub 110 for further instruction regarding mission completion or truncation.

In some embodiments, or in the invention, the system 100 can automatically control devices of the structure 10 to facilitate operation of the robot 200. For example, the system 100 (e.g., via instructions from the hub 110) can automatically turn on a light fixture 34 using a controller 128 to illuminate a region viewed by the camera 270B of the robot 200.

According to some embodiments, or in according to the invention, the system 100 uses data collected by the environmental sensors of the mobile robot 200 to enable or enhance the monitoring and/or control functions and processes of the system 100. The robot environmental sensors 270A-H (which are networked to the hub 110 and/or the remote management server 150) can thereby be used in place of or in addition to the stationary sensors 120, 122, 124 to provide input data to the hub 110 and/or the remote management server 150. As discussed above, the locations of the robot environmental sensors 270A-H in the enclosure space 20 can be determined and registered so that the readings from the robot environmental sensors 270A-H can be correspondingly registered with respect to the space 20.

The temperature sensor 270C can be used to detect an ambient temperature at a location in the space 20 other than the location(s) of the stationary temperature sensor(s). In this way, the system 100 obtains a temperature data set that more accurately reflects the temperature distribution in the space 20. The system 100 may respond by modifying operation of the HVAC system 40 or other devices (e.g., automatically opening or closing thermal shades) or reporting the temperature distribution to a user.

The ambient light sensor 270D or camera 270B, for example, can be used to detect the light level in a zone and/or entering through a window 30. Based on the data from this sensor robot or sensors, the system 100 may use a controller 126 to close a shade 30A on the window or notify a user that the shade should be closed.

Similarly, the camera 270B or other sensors on the robot 200 can be used to detect open windows 30 or doors 32. In this manner, the robot 200 can monitor portals to and zones of the enclosure space for security or other purposes.

One or more of the robot sensors 270A-H may be used to sense an occupant in the enclosure space 20. The mobile robot 200 can significantly improve the occupancy detection capability of the system 100 by providing occupancy data at a location or locations that are not available to the stationary sensors 120, 122, 124. The occupancy information collected by the robot 200 may be used alone or to supplement occupancy information collected by one or more of the stationary sensors 120, 122, 124. Sensors on the robot 200 can be used to detect environmental conditions and collect occupancy data in support of occupancy sensing systems as disclosed in U.S. Published Application No. 2012/0066168 (the disclosure of which is incorporated herein by reference), for example.

According to some embodiments, or according to the invention the mobile robot 200 determines whether an electronic device is turned on and, if so, automatically turns off the electronic device. In some embodiments, or in the invention, the robot 200 detects that the TV 36 is on (e.g., using the camera 270B or a radiation sensor 270A, 270D) and responds thereto by turning the TV 36 off (e.g., using the IR modulator 260) or notifying the hub 110, which turns the TV 36 off (e.g., using controller 126).

According to some embodiments, or according to the invention the system 100 uses environmental information collected by the robot sensors 270A-H for energy management execution, planning and/or reporting. The system 100, using sensor data from the robot 200, can determine that an automated control response is needed and initiate the response. The system 100 using sensor data from the robot 200 therefore monitors human occupancy behaviors and make suggestions for improving energy efficiency.

For example, the system 100 may determine from data acquired by the camera 270B that the window shade 30A should be closed to block out light and actuate the controller 126 to close the shade 30A. By way of further example, the robot 200 can detect that a light 34 is on at a time or under conditions when it should not be and the system 100 can respond thereto by actuating a controller 126 to turn off the light 34. In some configurations, the system 100 may notify the user (e.g., via the terminal 142 or the terminal 144) that action may be needed (e.g., close the shade or turn off the light) rather than automatically executing the action. In this case, the system 100 may be configured to enable the user (e.g., via the terminal 142, 144) to instruct the system 100 to execute the desired action. Regardless of how the action is executed, directly by a user or indirectly via the system 100, the robot 200 uses the sensors 270A-H to confirm (e.g. visual confirmation with an onboard camera) that a desired action is completed (e.g. light turned off, shades drawn, door shut, storm window lowered, etc.).

According to some embodiments, or according to the invention, the system 100 is configured to evaluate the data from the environmental sensors (including the robot sensors), generate a usage report, energy management plan, proposal or recommendation based on the data, and report the report, plan, proposal or recommendation to a user (e.g., at the terminal 142, the remote terminal 144, the hub 110, the robot 200 or otherwise).

In some embodiments, or in the invention, the system 100 collects device usage data, determines a pattern of device usage, generates a recommendation plan for operating or deploying energy management equipment, and reports the recommendation or plan to the user. For example, the system 100 may monitor the statuses (on or off) of the light bulbs and recommend to the user that the user program the system 100 or purchase and install certain home automation equipment (e.g., light controllers or IP addressed light bulbs (e.g., IPv6 addressed LED light bulbs available from Greenwave Reality)) to automatically turn certain of the lights on and off. The system 100 may plan a deployment strategy for networked energy management equipment. The system 100 can report the user's behavior patterns and suggest priority for adding different automated elements to the network.

The system 100 may provide the user with Internet URL links to webpages describing equipment recommended for addition to the system and/or to webpages for purchasing such equipment.

The robot 200 can use an onboard sensor (e.g., the IR detector 270A or a photodiode) to assess whether a lamp (e.g., an incandescent light bulb) has burned out or is near its end of life and will soon burn out and, if so, the system 100 can send the user a message reporting the same. The message may include an Internet link to a webpage where a replacement lamp can be purchased. For example, in one embodiment, or in the invention, the robot 200 includes a photodiode for sensing the frequency component of light.

The mobile robot 200 may be used to charge (in some embodiments, or in the invention, wirelessly (inductively)) a battery 120A of one or more of the stationary sensors 120, 122, 124, the controllers 126 and the hub 110 using the charger 226. One or more of the components 120, 122, 124, 126, 110 may be configured and used to charge (e.g., wirelessly) the battery 224 of the robot 200 and/or the robot 200 may be charged by the dock 140.

According to some embodiments, or according to the invention, substantive processing of the environmental sensor data collected by the robot 200 as described herein is conducted entirely or primarily remotely from the robot 200. In some embodiments, or in the invention, said processing is conducted entirely or primarily at the cloud or remote management server 150. However, in other embodiments, or in the invention, all or a portion of the processing of the robot sensor data may occur in the hub 110.

In some embodiments, or in the invention, the environmental sensor data from the robot sensors 270A-H is sent to the hub 110, which in turn forwards the robot sensor information, or information derived from the robot sensor information, to the remote management server 150 for computation. The remote management server 150 will then send a report or recommendation to the user (e.g., at a terminal 142, 144) based on the computation.

In some embodiments, or in the invention, different types or modes of processing are executed on different components of the system. For example, 1) the robot 200 may detect that the TV 36 is turned on and determine that it should be turned off, 2) while the hub 110 may assess and process the sensor data from the stationary sensors 120, 122, 124 and the robot sensors to determine whether a zone is occupied, 3) while the remote management server 150 is used to evaluate usage pattern data to generate an energy management strategy. It will be appreciated that, in accordance with embodiments of the invention, or in accordance with the invention, other system architectures may be used that distribute processing response and reporting duties differently than those described above.

According to some embodiments, or according to the invention, the system 100 will deploy the mobile robot 200 to collect environmental data in response to data collected by a stationary sensor 120, 122, 124 or in response to instructions from a user (e.g., via a remote terminal 144). For example, when the system 100 is in a security mode and the hub 110 or remote management server 150 receives data from a stationary sensor 120, 122, 124 indicating the presence of an occupant or opening of a door or window, the system 100 may respond by launching the mobile robot 200 to patrol or investigate a selected zone or zones or the space 20 generally. The robot 200 may send images (e.g., still photos or a live video feed) from the camera 270B or other environmental sensor data to enable the system 100 or user to confirm or better assess the nature of the intrusion or occupancy.

Turning now to the connectivity of household appliances, in accordance with FIGS. 5-13, several embodiments of the present invention include, or the invention includes, a mobile robot 200 communicating with an end user terminal 142, 144 via a networked hub 110.

In some embodiments and according to a first aspect, or according to the invention, a household mobile robot 200 for "coverage" missions (sweeping, vacuuming, mopping, spreading fluid, and/or any combination of these) uses a suitable technique or techniques, in some embodiments, or in the invention, "Simultaneous Localization and Mapping" (SLAM) techniques, to generate a map of the surface being, for example, vacuumed. There are various techniques, and various maps that may be generated. Maps may be topological, Cartesian, polar, representational, probabilistic, or other; and/or may track walls, obstacles, open spaces, fiducials, natural features, "occupancy", or other map features. In some techniques, many maps, each of some degree of probable correctness, are recorded. In common, however:

1) The surface area in which the robot 200 expects to be able to localize grows over time (i.e., "the map" gets bigger as the robot 200 travels);

2) A relationship between "the map" recorded by the robot 200 and the actual household floorplan (e.g., Zone A, Zone B and Zone C in FIG. 4) may be generated or modeled and graphically represented, and at some point the map of navigable area (or a subset of it) is substantially complete;

3) For a coverage robot 200, areas over which the robot 200 has already traveled have been simultaneously covered (usually cleaned or vacuumed), and the covered area may be graphically represented as an irregular area within the complete map;

4) A ratio or other comparison between the covered area and the complete map can be calculated as a percentage or other representation of partial completeness;

5) Specific physical items, such as a hub or gateway device (e.g., hub 110) or a robot dock (dock 140), may be located within and represented within the complete map if the robot 200 or another device hosting the complete map receives a localization for such items within the complete map; and 6) Meaningful subdivisions of the complete map may be assigned based on analysis or user input. For example, a leftmost third of the complete map may be designated as corresponding to a kitchen area, a middle section as a living room, and so on. These room identities may be stored as sub-areas or sub-divisions, as transition lines from one subdivision to another, as localized markers within the complete map, or the like.

In the first aspect, the autonomous mobile robot 200 may be provided with sufficient SLAM capability to build a progressively improving map at the same time as it covers (e.g., cleans) within this map, as well as sufficient connectivity to transmit map data (e.g., entire sets of map data, simplified representations of map data, or abstractions of map data). For example, this could include: a microprocessor; a set of sensors collecting and/or calculating range and bearing data from environmental features (including natural landmarks, placed landmarks, and/or walls and obstacles); a map database including at least one progressively improving map; a coverage database including data representing the covered area within the progressively improving map; and a wireless transmitter or transceiver.

In order to reach the public internet with its data or representations and/or abstractions thereof, the microprocessor and/or wireless transmitter or transceiver (including those with their own embedded microprocessors) would communicate using IP (Internet Protocol) and support conventional addressing and packetizing for the public Internet 170.

Any portion of the map database or coverage database may be transmitted to and stored in a location other than the robot 200, e.g., a local hub 110 or gateway within the household, a hub, gateway, server or similar on the Internet, or virtualized instances of the same available on the Internet.

Figure 5:
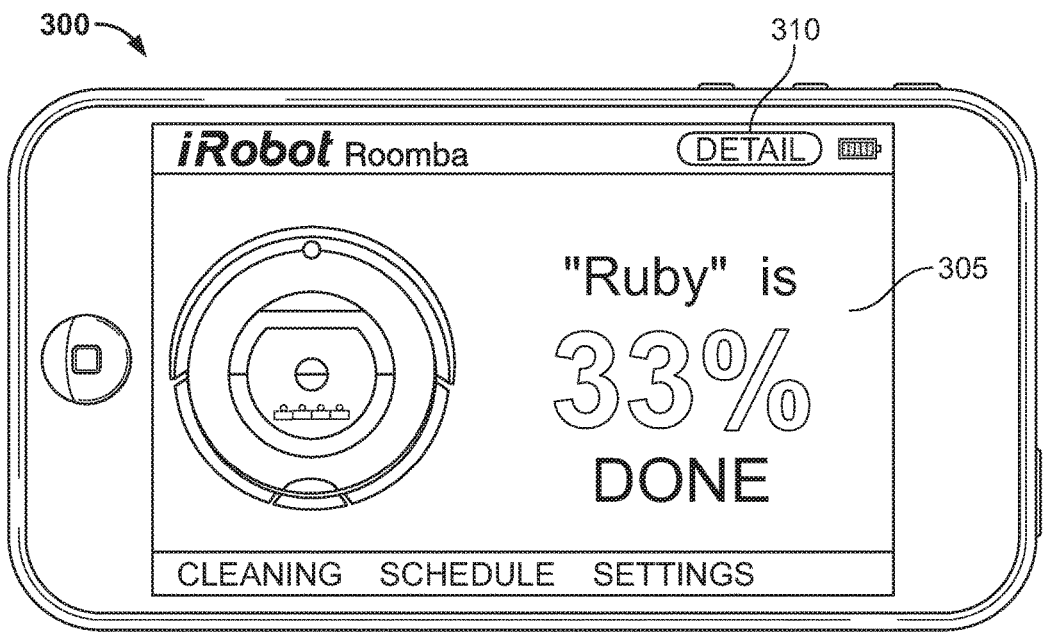
FIGS. 5-18 are plan views of a mobile user terminal which may form a part of the environmental management system of FIG. 1, illustrating screen displays of the mobile user terminal and related operations according to methods and computer program product embodiments of the present invention.
Figure 6:
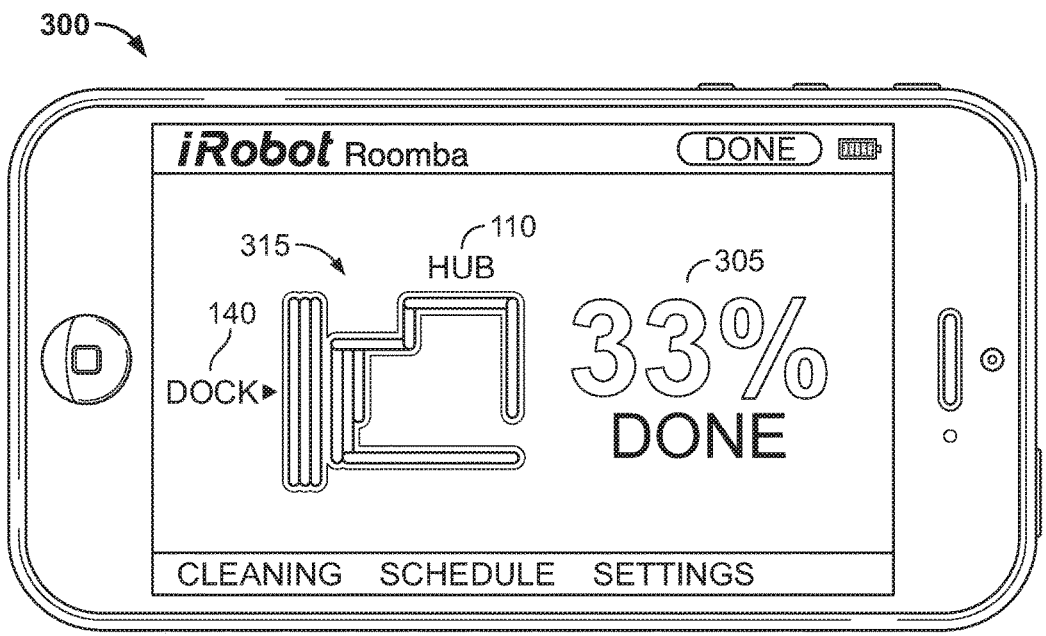

In some embodiments according to the first aspect, or according to the invention, and as illustrated in FIGS. 5 and 6, an application executed by a mobile terminal or device 300 (including but not limited to, for example, a mobile telephone, smart phone or tablet) receives the progressively improving map as well as the covered area within the progressively improving map, compares the two, and displays a representation of the comparison, such as a completion ratio 305 (e.g., percent covered or done by the mobile robot 200). The application instantiates and maintains a user interface element 310 for an end user (e.g., the user of the mobile device 300) to activate to elect to examine the covered area and/or progressively improving map 315 itself. The mobile device 300 may be the local user terminal 142 including a touchscreen HMI, for example.

When the end user activates the user interface element (e.g., the application icon on the touchscreen of the mobile device 300), the application executes a graphical representation of the progressively improving map and the same is displayed, and within this graphical representation, a second graphical representation of the covered area is displayed. It should be noted that the first graphical representation may be replaced with an envelope limiting the extent of the second graphical representation. Optionally, physical devices or locations (such as the location of a robot dock, or the location of an internet gateway) may be localized by the robot 200 and displayed by the application in positions relative to the first graphical representation of the progressively improving map.

Figure 7:
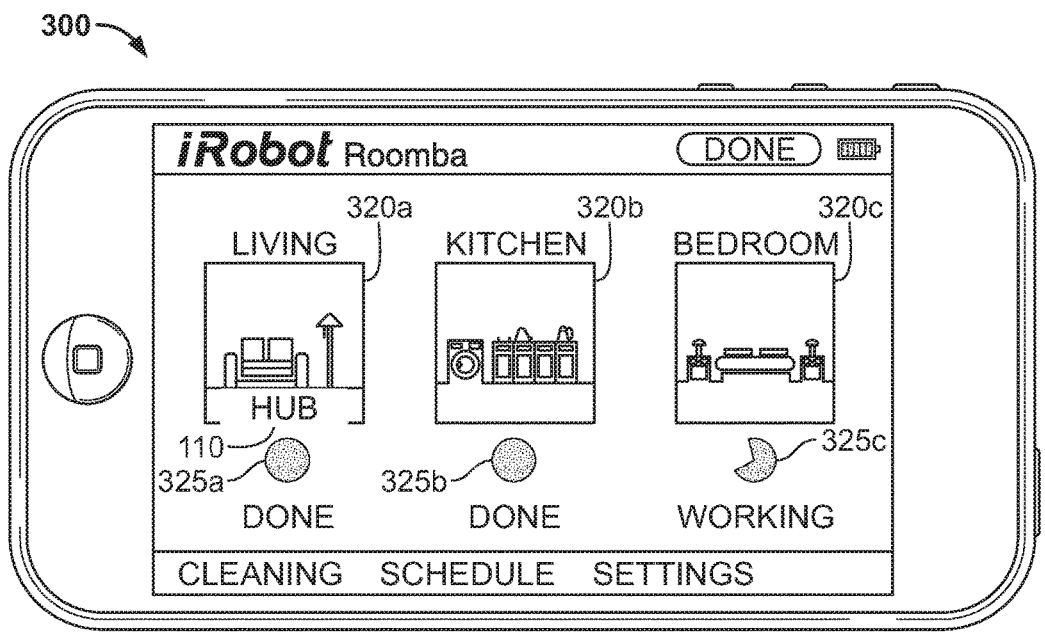

According to FIG. 7, in an alternative example, when the user interface element is activated, the application executes a graphical representation of room identity markers 320a, 320b, 320c within the progressively improving map coupled with a completion ratio 325a, 325b, 325c for subdivisions of the complete or progressively improving map 315. That is, each subdivision may have its own completion ratio 325a, 325b, 325c, which may be derived, for example, by comparing the covered area to each subdivision. Optionally, physical devices or locations (such as the location of a robot dock 140, or the location of an internet gateway or hub 110) may be localized by the robot 200 and displayed by the application in positions corresponding to their subdivision.

Figure 8:
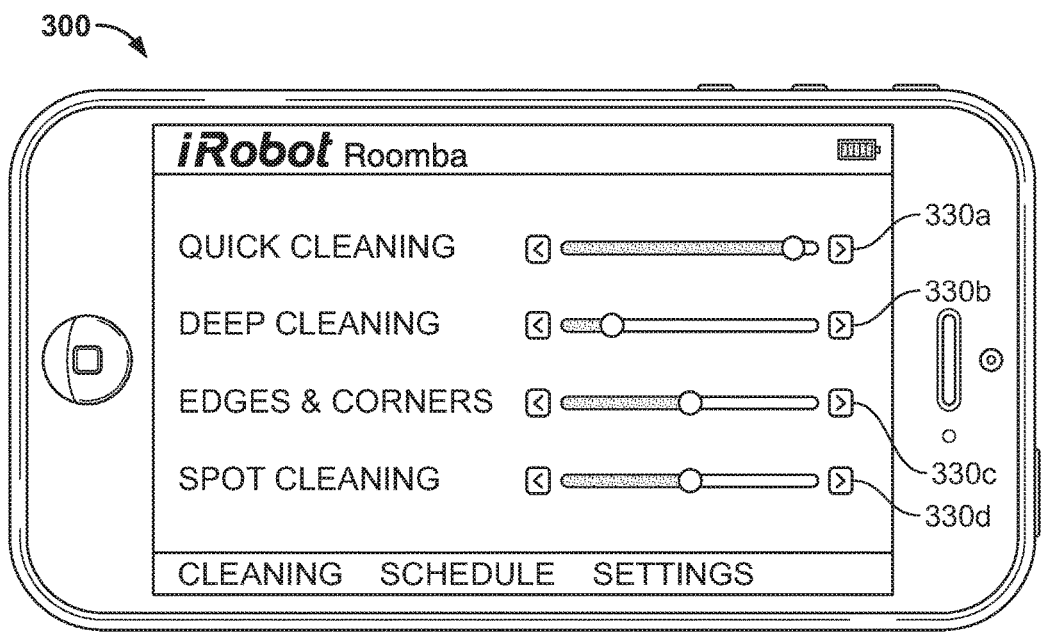
Figure 9:
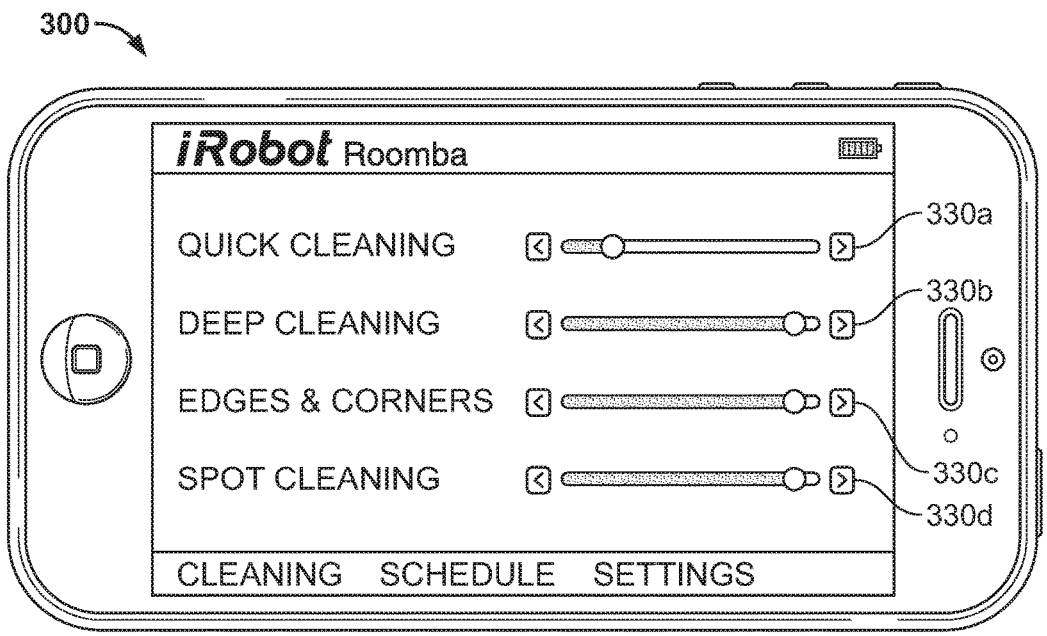

In accordance with FIGS. 8 and 9, according to a second aspect an autonomous mobile robot 200 is provided with the elements noted above, and also interacting tunable parameters 330a-330d within its cleaning strategy.

For example, a mobile cleaning robot 200 is theoretically able to execute substantially single-pass coverage (i.e., clean each portion of surface area one time and one time only), by following a strategy to cover only area within the progressively improving map 315 that has not already been covered. Perfect single-pass coverage is challenging with an unknown map. Substantial single-pass coverage would be, for example, where the areas that needed to be reached within the progressively improving map were separated by already-covered patches.

This would seem to be ideal, as single-pass coverage is the fastest way to complete the room. However, depending upon the efficacy of a cleaning, spreading, mopping, vacuuming effector, two-pass coverage, or multi-pass coverage, may be the best way to clean. Many stubborn particulates need multiple pass coverage to be adequately cleaned.

Moreover, end users have shown a marked preference for spot cleaning (i.e., cleaning where they can visibly identify a dirt patch themselves, or where dirt is known to be) and also for edge and corner cleaning. Preferences aside, this can also increase overall efficacy, as repeated cleaning of a known dirty area can improve the average level of cleanliness, and corners and edges naturally accumulate dirt with ordinary traffic in any home.

However, these goals (single-pass or "quick" cleaning, multi-pass or "deep" cleaning, spot cleaning, and edge and corner cleaning) are to some extent mutually exclusive. If a mobile cleaning robot 200 repeatedly addresses a dirty spot, it cannot achieve substantially single-pass cleaning (because the dirty spot has been passed over) and will take more time to complete the entire room (absent changes in cleaning power or speed). If a robot 200 follows the perimeter of obstacles and walls twice instead of once, similarly, it takes longer than a single pass.

As such, these goals are correlated with one another. If a robot 200 is commanded to execute the best possible single-pass coverage as an overriding goal, it will never do spot coverage or address edges more than once, and can only begin to perform multiple passes (two, three or more) once the first pass is complete.

Tunable parameters within a cleaning strategy may include time balance (e.g., spend 80 percent of time in single pass mode, entering spot covering mode only 20 percent of opportunities); sensitivity (e.g., enter spot covering mode only when a threshold is crossed, interrupting other modes only upon that threshold event); power output (faster agitation or higher vacuum airflow); and/or forward speed (the traveling speed across a floor).

In one implementation, attention among these goals may be balanced by controlling one or more parameters to lower as one or more than one other parameters increase.

For example, if a slider control is provided in a user interface to represent single pass or quick cleaning goal orientation—for example, 0-100 points of orientation—then a linked, simultaneously and optionally oppositely moving slider may represent multi-pass or deep cleaning orientation. Should the quick cleaning slider 330a be moved to 100 points or percent of attention, such as illustrated in FIG. 8, the robot's 200 cleaning strategy may seek to revisit cleaned areas as little as possible (and the coupled multi-pass slider 330b is automatically coupled to decrease to 0 or very few points). Note that the slider controls in this example reflect a parameter available to the robot's 200 cleaning strategy.

Should the slider 330a be moved to a 50-50 position (with the multi-pass slider coupled to move there as well), the robot's 200 cleaning strategy may seek to prioritize exploring uncertain areas, edges, corners, or map frontiers more, or may concentrate on re-covering proximate areas (e.g., in a different direction).

Another pair of potentially linked sliders may be spot cleaning 330d and edge and corner cleaning 330c. As noted, there are different ways of having two conflicting goals interact. In this case, one way would be to permit the robot 200 to spot clean and/or edge clean opportunistically (upon sensing either of dirt/spot opportunity with optical or piezo sensing, or edge opportunity with proximity sensing), but should both opportunities be detected simultaneously, to permit the higher setting to win more often. This may show a shift in cleaning strategy at 70 percent versus 30 percent "winning" percentage, for example. It should be noted that the sliders or coupled parameters can be set to change interactive principle at along the attention or orientation range. For example, in more skewed or imbalanced settings, e.g., 90 percent versus 10 percent, the robot 200 could begin to ignore opportunities to, for example, spot clean to pursue more opportunities to edge clean.

More than two sliders or tunable parameters may be linked. For example, if all of the quick clean, deep clean, spot clean, and edge clean sliders 330a-330d were linked, moving any one of them may move the others to less emphasis or more emphasis (e.g., in the corresponding direction of slider and attention parameter). As a specific example, if a spot cleaning attention parameter were increased, the robot's 200 reactive threshold to dirt detection could be lowered (or frequency of response, or other parameter that translates into increased orientation). In such a case, the robot 200 may be expected to repeatedly cover already covered areas (lowering the quick clean slider 330a and a corresponding parameter), to spend less time on edges and corners (lowering that slider 330c and corresponding parameter), and to re-cover more areas (increasing the multiple pass slider 330b and corresponding parameter).

The second aspect may include an application executed by a mobile device (including but not limited to a mobile telephone, smart phone or tablet) the receives the current state of the interactive parameters from the robot 200, instantiates user interface controls representative of the relative states (such as slider controls 330a-330d), and displays a representation of the relative states of the parameters using those controls. The application monitors the user interface elements or controls for an end user (e.g., the user of the mobile device 300) to activate to change a parameter, or a percentage emphasis on a parameter, or the like.

When the end user activates the user interface element, the application on the mobile device 300 executes a graphical representation of the progressively changing parameter, and simultaneously with representing the change in one parameter, alters one or more other controls to display a coupled parameter changing simultaneously with the user-controlled activity in the active control.

Figure 10:
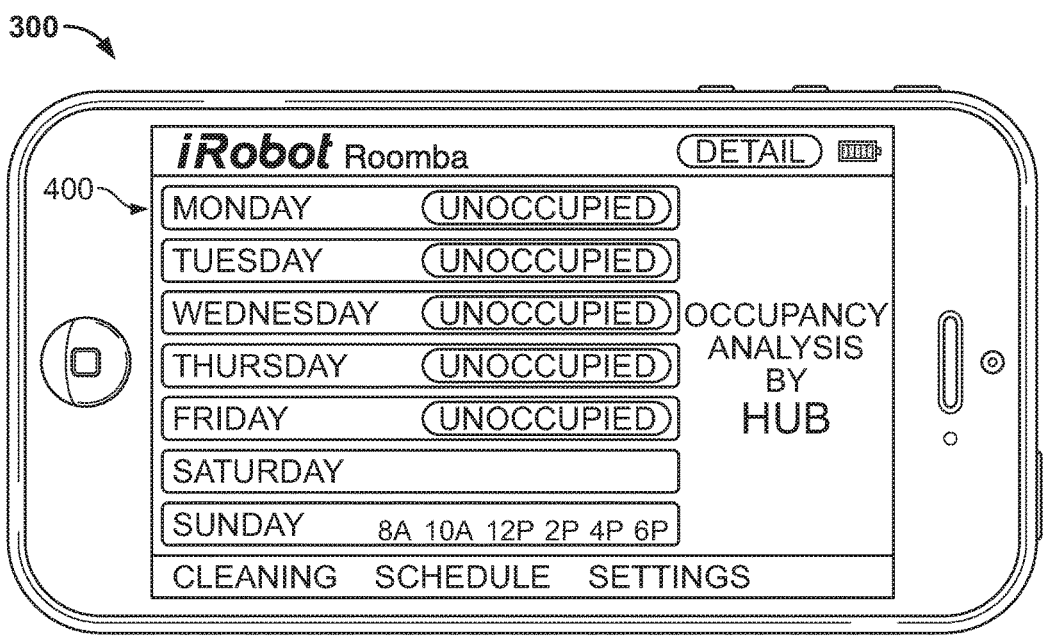
Figure 11:
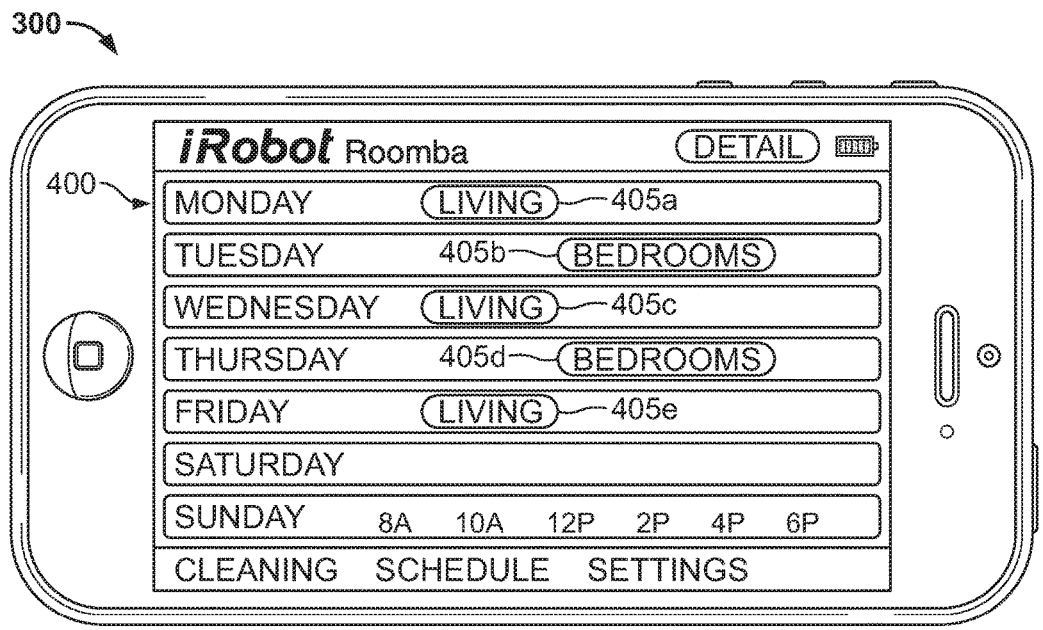
Figure 12:
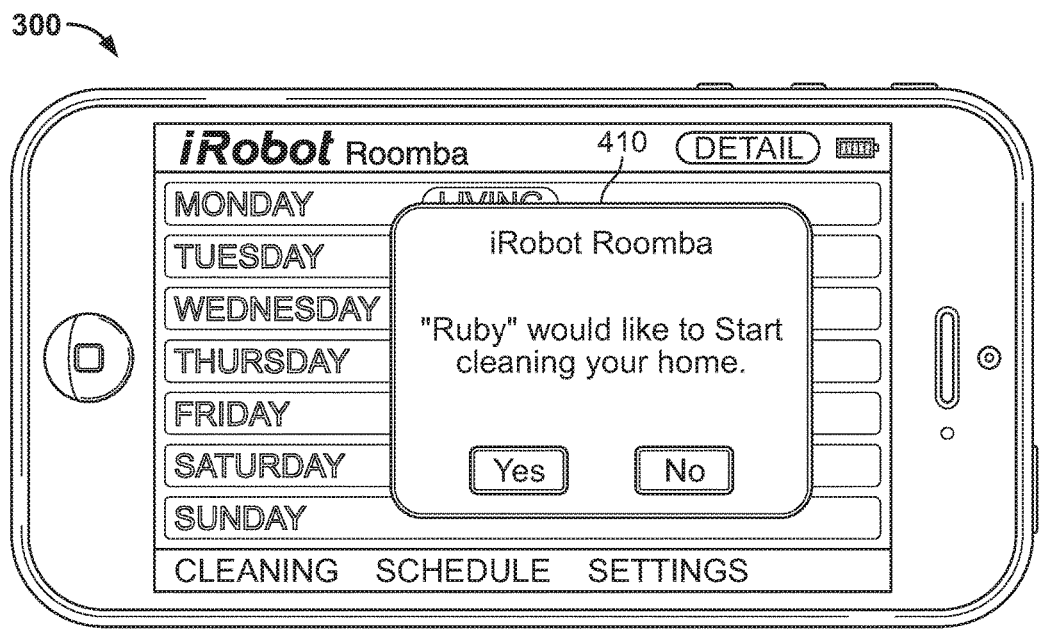

Turning now to FIGS. 10-12, in another embodiment according to a third aspect, or according to the invention, an autonomous mobile robot 200 is provided with sufficient timer and scheduling capability to self-initiate cleaning on a schedule or be commanded to initiate remotely, as well as sufficient connectivity to communicate schedules and receive commands. In addition, the robot 200 may include connectivity to a local access point or hub 110 which includes, or is connected to, an occupancy sensor. One example of such an Access Point 110 is the NEST™ thermostat, which in addition to controlling household temperatures is connected to the public Internet 170 and local Internet of Things articles via IEEE 802.11 and 802.14 protocols and hardware and may address and exchange messages with remote clients and local articles. In addition, the NEST thermostat includes occupancy sensors (e.g., a passive infrared monitor which can detect passing human body heat and movement, a microphone which can detect ambient noise, and/or an ambient light sensor which can detect variations in light as passers-by obscure it).

In some embodiments, according to the third aspect, or according to the invention, the system of robot 200 and hub 110 (access point acting as a bridge between household Ethernet or 802.11 networks and the robot 200), for example, may include: a microprocessor; a set of sensors collecting and/or human occupancy data from environmental electromagnetic, acoustic, or other sensing; an occupancy database including at least one progressively more accurate profile of household traffic and/or presence map; a scheduling database including data representing the intended missions compatible with the occupancy database; and wireless transmitters or transceivers.

In an example of data collection and communications message flow, the hub 110 may, over the course of a week or longer, survey the local household and identify traffic patterns, with the goal of aligning cleaning schedules of the robot 200 with unoccupied household time(s). The data is analyzed (e.g., anomalies removed, etc.) and stored in an occupancy database.

The occupancy database may be retained by the hub 110, or communicated to the mobile robot 200. In general, it is advantageous to keep small data sets such as this on the mobile robot 200 itself because wireless communications in the home may be interrupted, noisy, or of varying strength throughout a large household.

Any portion of the databases discussed herein may be transmitted to and stored in a location other than the robot 200 (e.g., a local hub 110 or gateway within the household, a hub, gateway, server or similar on the Internet 170, or virtualized instances of the same available on the Internet 170). Most advantageously, the scheduling process works interactively with a charging and/or evacuating dock 140, such that the robot 200 may launch on schedule in a fully charged and/or empty (cleaning bin) state.

In another embodiment, or in the invention, an end user, presented with the occupancy opportunities may schedule activity of the robot in different ways, such as the following:

(1) Requesting the system (hub 110, robot 200, or either) to advantageously schedule household cleaning automatically in the best times available;

(2) Selecting times within the presented occupancy, and/or overriding suggestions from the auto-scheduler;

(3) Adding schedule elements even when the home is occupied, for other needs; or (4) Tuning room to room coverage, to designate rooms or areas for specific attention on a specific day.

This embodiment, or the invention, may use interactive user interface elements in a mobile device application.

As depicted in FIGS. 10 and 11, when the end user activates the user interface element on a mobile device 300, the application executes a graphical representation of the occupancy database 400 and displays the same. In a modification within this graphical representation 400, a second graphical representation of user selected times 405a-405e within the occupancy database is successively displayed or overlayed.

As depicted in the embodiment of FIG. 12, or in the invention, an end user may wish to be notified when the robot 200, hub 110, or combination of the two intend to launch a cleaning mission, even when the schedule has been approved (or the robot 200 is self-launching according to other criteria). This request notification 410 may be presented to the user on a remote user terminal 144, such as a remote mobile device 300. In some cases, the end user may wish to cancel the launch (for example, if the user is in fact at home but has simply been too quiet for occupancy sensing to operate).

Figure 13:
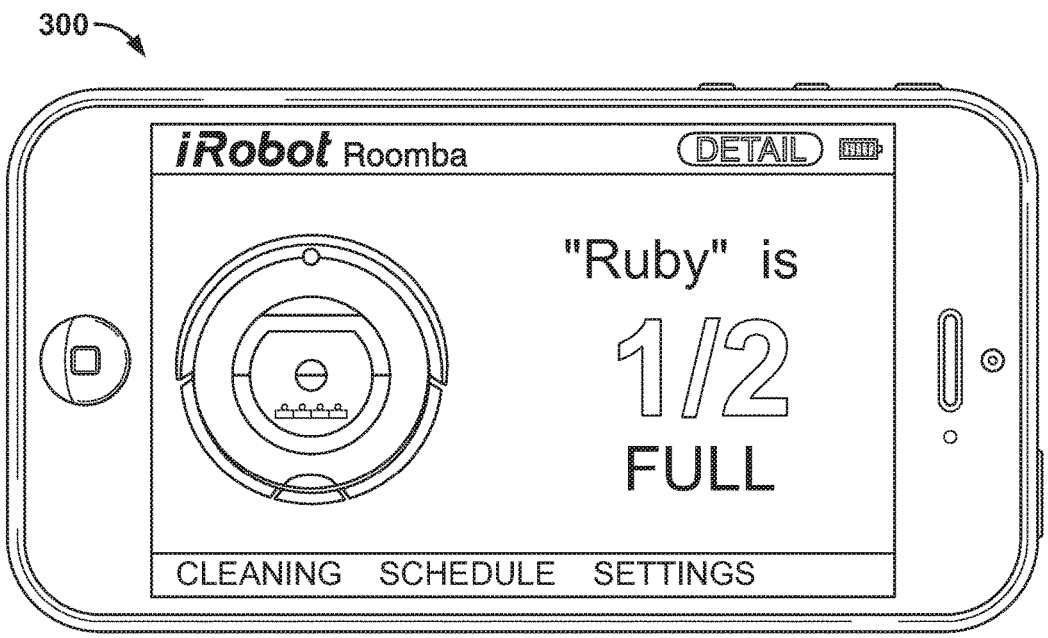
Figure 14:
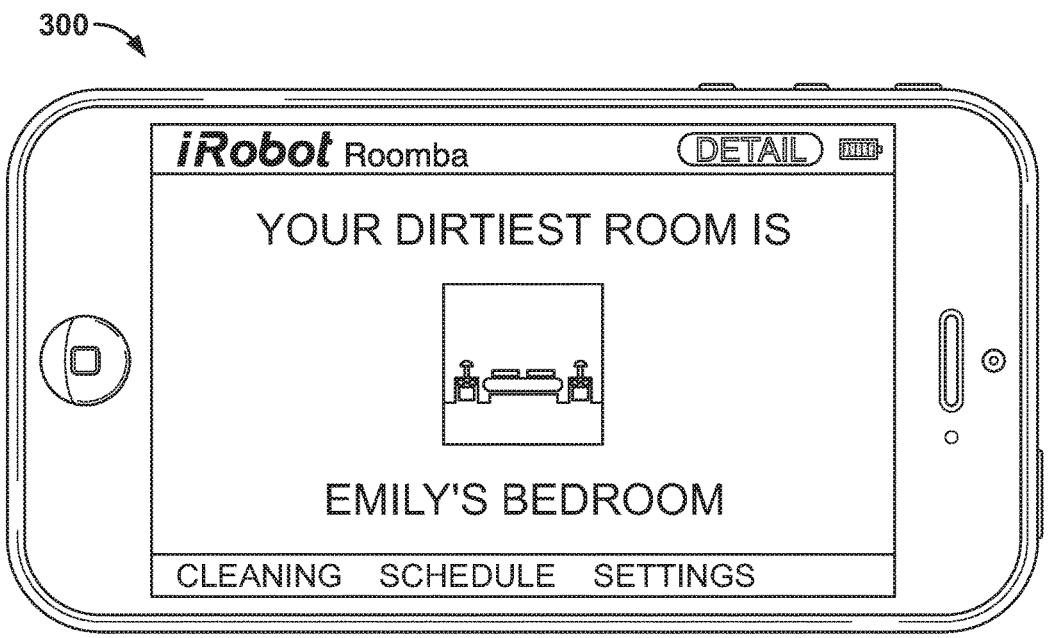

In other embodiments depicted in FIGS. 13 and 14, or in the invention, a user may launch an application via a user interface element on a mobile device 300 to provide calculated information that may be of interest to the user, such as the amount of matter collected by a cleaning robot 200 and/or the location at which the greatest amount of matter was collected. For example, a bin debris sensor maybe used to track the amount of matter entering the robot collection bin. Using a known bin volume, the robot 200 may extrapolate the capacity occupied or remaining in the collection bin based on the amount and/or frequency of matter passing by the debris sensor. Additionally, in embodiments of the robot 200 having mapping capabilities, or in the invention, the robot 200 may track the rate of debris collection and/or the amount of debris collected at various delineated areas or compartments within a floor plan and identify the room containing the largest amount of collected debris.

Figure 20:
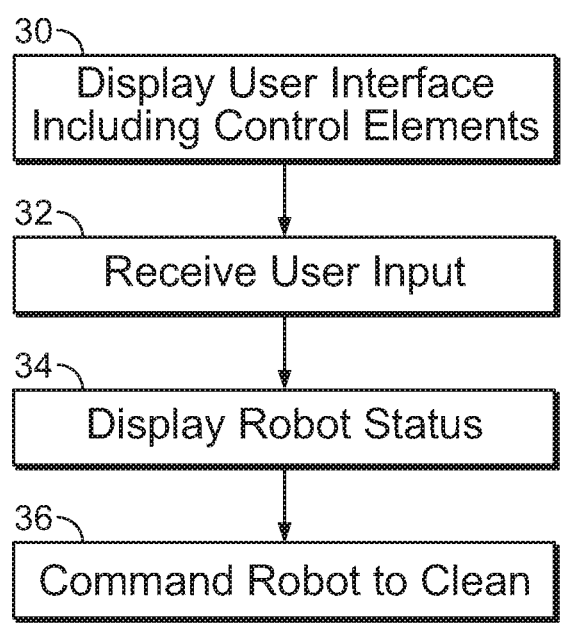
FIG. 20 is a flowchart representing methods according to some embodiments or according to the invention.

With reference to the flowchart of FIG. 20, a computer-implemented method according to some embodiments of the present invention, or according to the invention, for receiving user commands for a remote cleaning robot and sending the user commands to the remote cleaning robot (the remote cleaning robot including a drive motor and a cleaning motor) is represented therein. The method includes displaying a user interface including a control area, and within the control area: a user-manipulable launch control group including a plurality of control elements, the launch control group having a deferred launch control state and an immediate launch control state; at least one user-manipulable cleaning strategy control element having a primary cleaning strategy control state and an alternative cleaning strategy control state; and a physical recall control group including a plurality of control elements, the physical recall control group having an immediate recall control state and a remote audible locator control state (Block 30). User input is then received via the user-manipulable control elements (Block 32). Responsive to the user inputs, a real-time robot state reflecting a unique combination of control states is displayed simultaneously within the same control area (Block 34). Concurrently or thereafter, the remote cleaning robot is commanded to actuate the drive motor and cleaning motor to clean a surface based on the received input and unique combination of control states (Block 36).

Figure 15:
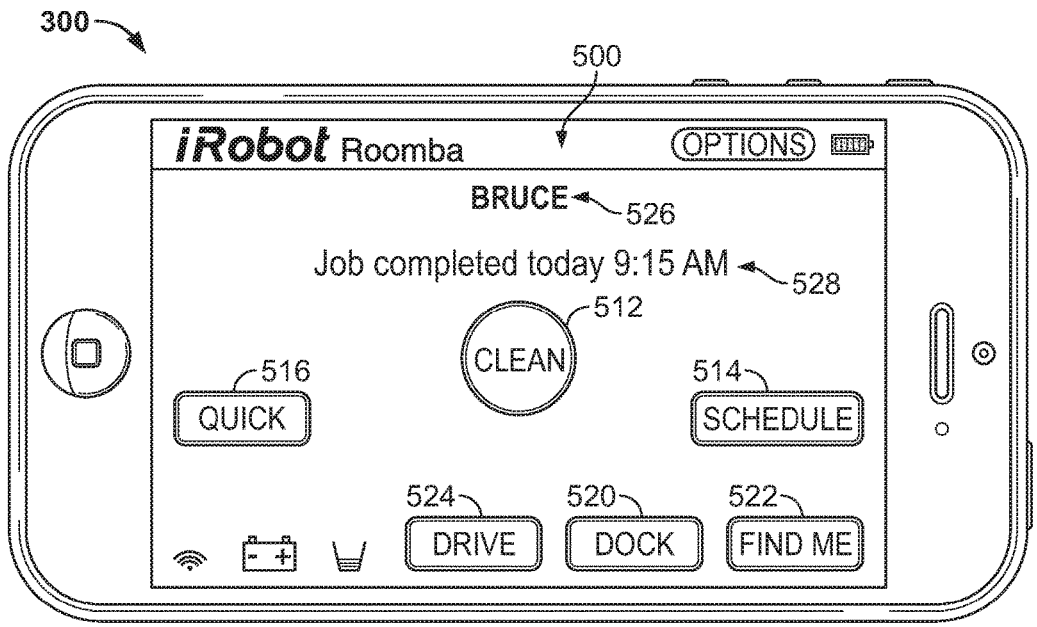

According to further embodiments, or according to the invention, and with reference to FIGS. 15-18, an application is provided on a mobile device 300 (which may be, for example, the local user terminal 142 having a touchscreen HMI) to provide additional functionality as described below. FIG. 15 shows an exemplary home screen 500 provided by the application to enable control and monitoring of the robot 200. The home screen 500 includes a control area 501 (the active input area of the touchscreen display of the device 300) and therein user manipulable control or interface elements in the form of a cleaning initiator button 512, a scheduling button 514, a cleaning strategy toggle button 516 (which toggles alternatingly between "QUICK" and "STANDARD" (not shown) status indicators when actuated), a dock recall button 520, a robot locator button 522, and a drive button 524. The home screen 500 may further display a robot identification 526 (e.g., a name ("Bruce") assigned to the robot 200 by the user) as well as one or more operational messages 528 indicating a status of the robot 200 and/or other data.

When activated, the cleaning initiator button 512 will cause the device 300 to command (via wireless signal) the robot 200 to begin a prescribed cleaning protocol.

The cleaning strategy button 516 can be used to select from a plurality of different available cleaning modes, settings or protocols, examples of which are discussed in more detail below. In particular, the cleaning strategy button has a primary cleaning strategy control state (i.e., "Standard clean" or "Deep clean") and an alternative cleaning strategy control state (i.e., "Quick clean").

Figure 16:
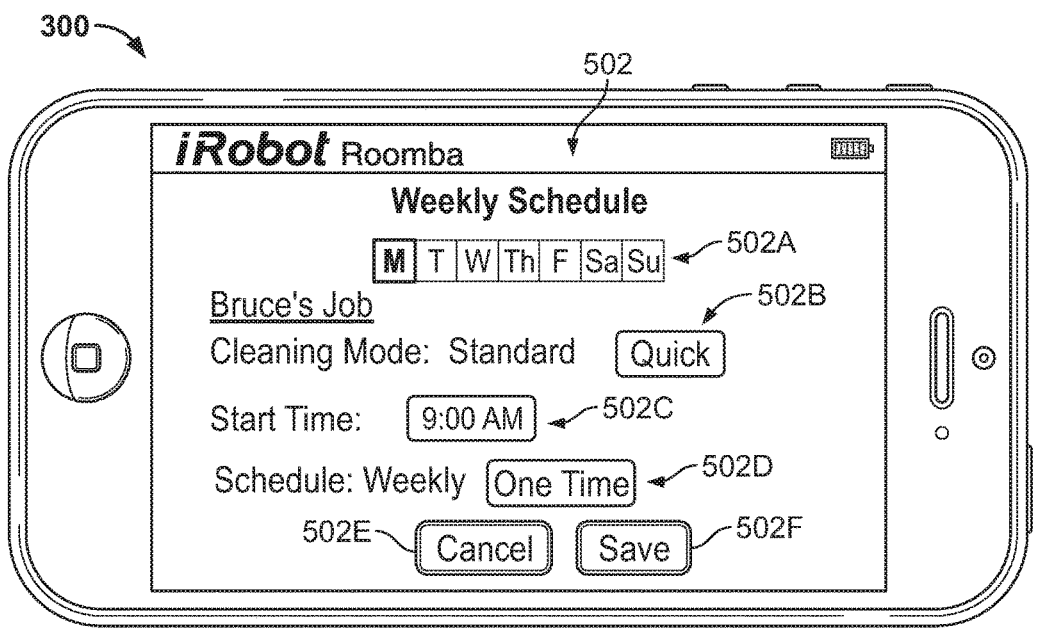

When activated, the scheduling button 514 will initiate a scheduling screen 502 as shown in FIG. 16. The user can use the control elements 502A-F therein to schedule a single cleaning operation/session or a periodic (e.g., weekly) cleaning operation/session by the robot 200. A cleaning mode (e.g., "Standard" or "Quick") as described below may be selected for each scheduled cleaning session using the control element 502B. A deferred command to begin and execute a configured cleaning operation or session can be initiated by actuating the "Save" button 502F.

The cleaning initiator button 512, the scheduling button 514, and the scheduling control elements 502A-F collectively form a user-manipulative launch control group. This launch control group has an immediate launch state (i.e., when the cleaning initiator button 512 is actuated) and a deferred launch control state (i.e., when the "Save" button 502F is selected).

The dock recall button 520 and the robot locator button 522 collectively form a physical recall control group. The physical recall group has an immediate recall control state (by actuating the dock recall button 520) and a remote audible locator control state (by actuating the robot locator button 522). When activated, the dock recall button 520 will cause the device 300 to command the robot 200 to return to the dock 140.

When activated, the robot locator button 522 will cause the device 300 to command the robot 200 to emit an audible signal (e.g., beeping from an audio transducer or speaker 274B; FIG. 3). The user can use the audible signal to locate the robot 200.

In use, the application on the device 300 receives user input via the above-described user manipulable control elements. Responsive to the user inputs, the application displays simultaneously on the device 300 within the control area 501 a real-time robot state reflecting the unique combination of the control states. The application further commands the robot 200 to actuate the drive system 230 (including a motive drive motor) and the cleaning system 242 (including a cleaning motor) of the robot 200 to clean a surface based on the received input and unique combination of control states.

When actuated, the drive button 524 will initiate a robot motive control screen (not shown) including user manipulable control elements (e.g., a virtual joystick or control pad) that the user can use to remotely control the movement of the robot 200 about the living space.

Figure 17:
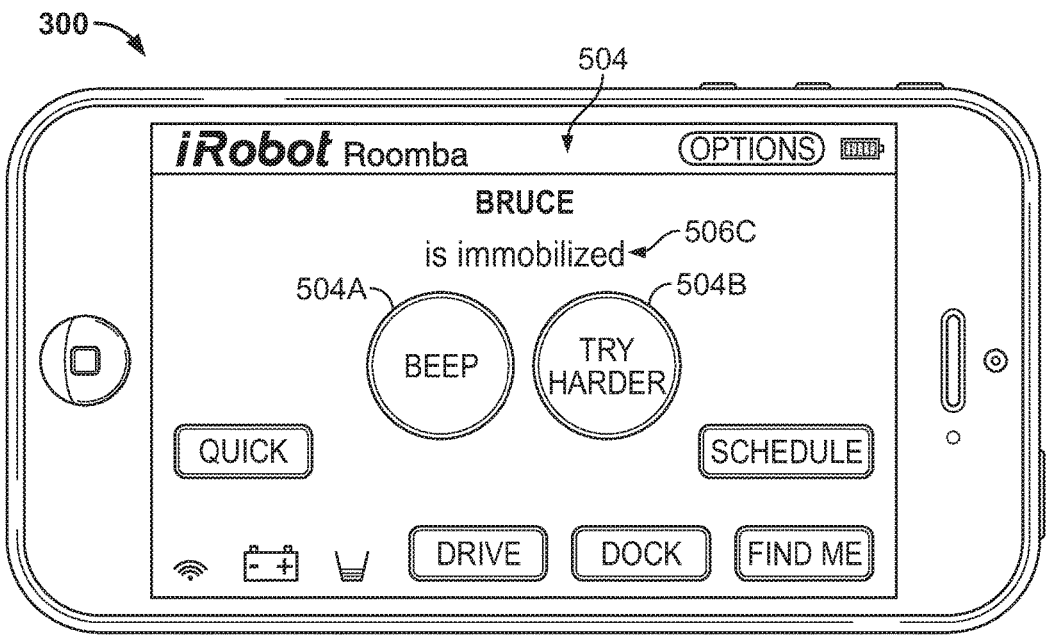

In some instances, the robot 200 may become immobilized or stuck during a cleaning session. According to some embodiments, or according to the invention, the robot 200 is enabled to recognize its immobilized condition and will send an alert signal to the user via the application on the device 300 (e.g., using SMS or email). The application will display an alert screen 504 as shown in FIG. 17 on the device 300. Additionally or alternatively, the alert screen 504 may be generated in response to the user actuating the cleaning initiator button 512 or the dock recall button 520 when the robot 200 is immobilized or otherwise unable to execute the commanded operation. The alert screen 504 includes one or more control elements manipulable by the user to perform a remedial, subsequent action. In some embodiments, or in the invention, a beacon control element such as a "Beep" button 504A can be actuated to command the robot 200 emit an audible signal from the audio transducer 274B. In some embodiments, or in the invention, an escape maneuver control element 504B can be actuated to command the robot 200 to execute one or more prescribed maneuvers to attempt to disengage or become unstuck.

As discussed above, the application may enable the user to select between two or more cleaning strategies or modes (e.g., using the toggle button 516). According to some embodiments, or according to the invention, the user can (using the toggle button 516) instruct the remote robot 200 to perform either: 1) a lower cumulative energy cleaning strategy (also referred to herein as "quick clean") with the control element 516 in a first or primary cleaning strategy control state; or a higher cumulative energy cleaning strategy (also referred to herein as "standard" or "deep clean") with the control element 516 in a second or alternative cleaning strategy control state. As used herein, "cleaning energy" may be deployed in various ways; for example, the robot can either go longer or repeat passes, or can increase motor power, or can otherwise do "more" (standard) or "less" (quick) cleaning. Typically, the quick cleaning options (e.g., as described below) are cumulatively less work. For example, in some embodiments, or in the invention, the robot 200 passes substantially only a single pass over each portion of the covered area in the quick clean strategy or control state, and passes substantially two passes (e.g., the passes crisscross) over each portion of the covered area in the deep clean strategy or control state.

According to some embodiments, or according to the invention, the lower cumulative energy cleaning strategy ("quick clean") includes one or more of the following:

a. The robot 200 travels a deterministic, systematic or planned single pass coverage or travel pattern or path. In some embodiments, or in the invention, the travel pattern follows a boustrophedon path.

b. The robot 200 travels at faster forward speed (as compared to the deep cleaning control state) across the surface.

c. The robot 200 concentrates its cleaning in open areas.

d. The cleaning coverage of the robot 200 is configured to cover the most distance from the dock 140.

e. The robot 200 travels at at faster forward speed (as compared to the deep cleaning control state) across the surface combined with a higher vacuum power.

f. The robot 200 does not use a discovery process, but instead navigates using a stored map.

g. The robot 200 travels primarily only along rows in one direction (i.e., pattern is parallel rows with little or no crossing of rows).

h. The robot 200 does not detect the density of the dirt lifted from the surface being cleaned.

i. The robot 200 does detect the density of the dirt lifted from the surface being cleaned (e.g., using the dirt sensor 242C) and controls its path, speed or power in view thereof, but the dirt detection threshold required to trigger such modification to its cleaning operation is set at a higher threshold (as compared to the deep cleaning control state).

j. The robot 200 does not evacuate its onboard debris bin 242B during the cleaning session (i.e., except at the end of the cleaning session).

k. The robot 200 spends less time cleaning around time consuming clutter (e.g., table, chairs) (as compared to the deep cleaning control state).

l. The robot 200 cleans high traffic areas first.

m. The robot 200 avoids cleaning under anything invisible to visitors (e.g., under beds, chairs and couches).

u. The robot 200 concentrates its cleaning in a designated area.

According to some embodiments, or according to the invention, the higher cumulative energy cleaning strategy ("standard clean" or "deep clean") includes one or more of the following:

a. The robot 200 travels a deterministic, systematic or planned multiple pass (two or more) coverage or travel pattern or path. In some embodiments, or in the invention, the travel pattern follows a crisscross path.

b. The robot 200 travels at slower forward speed (as compared to the quick cleaning control state) across the surface.

c. The robot 200 concentrates its cleaning, at least in part, on edges and corners of the living space.

d. The cleaning coverage of the robot 200 is configured to cover the area within a full perimeter circle about the dock 140.

e. The cleaning coverage of the robot 200 is configured to cover the area within a full perimeter circle about the dock 140 twice.

f. The robot 200 concentrates its cleaning in the same area it started in.

g. The robot 200 travels at a slower forward speed (as compared to the quick cleaning control state) across the surface combined with a higher vacuum power.

h. The robot 200 does uses more discovery (as compared to the quick cleaning control state; e.g., the robot 200 probes edges and corners more).

i. The robot 200 travels along rows in intersecting directions (e.g., a crisscross pattern).

j. The robot 200 detects the density of the dirt lifted from the surface being cleaned (e.g., using the dirt sensor 242C) and controls its path, speed or power in view thereof.

k. The robot 200 detects the density of the dirt lifted from the surface being cleaned and controls its path, speed or power in view thereof, and the dirt detection threshold required to trigger such modification to its cleaning operation is set at a lower threshold (as compared to the quick cleaning control state).

l. The robot 200 evacuates its onboard debris bin 242A during the cleaning session to increase vacuum power.

m. The robot 200 executes a two or more stage cleaning pattern including a systematic (one or more passes) cleaning pattern and a random and edge diffusion pattern.

n. The robot 200 executes a multi-stage cleaning pattern including alternating systematic and random patterns.

o. The robot 200 detects the density of the dirt lifted from the surface being cleaned and cleans more if more dirt is detected.

p. The robot 200 cleans hallways more than once.

q. The robot 200 cleans using a scrubbing action.

r. The robot 200 cleans until its battery runs out (parking on the floor) or until the battery level is very low (and the robot 200 then returns to the dock substantially depleted of battery charge). In this case, the robot 200 may execute a commanded cleaning pattern and then assume an end cleaning mode until the battery charge level is sufficiently low. The end cleaning mode may include, e.g., perimeter cleaning, random pattern cleaning, or cleaning concentrated on prescribed or detected high dirt areas.

s. The robot 200 spends more time cleaning around time consuming clutter (e.g., table, chairs) (as compared to the quick cleaning control state).

t. The robot 200 spends more time in high traffic areas (as compared to the quick cleaning control state).

u. The robot 200 concentrates its cleaning in a designated area.

v. The robot 200 spends more time on area rugs (as compared to the quick cleaning control state).

w. The robot 200 spends more time on area rug perimeters and edges (as compared to the quick cleaning control state).

x. The robot 200 seeks to clean under furniture for completeness (e.g., under beds, chairs and couches).

y. The robot 200 detects (e.g., using the dirt sensor 242C) the character or attributes of the dirt lifted from the surface being cleaned and controls its path, speed or power in view thereof. For example, the robot 200 provides less deep cleaning responsive to detection of fuzzy or fluffy dirt, and more deep cleaning responsive to detection of particulate or sandy dirt.

Figure 18:
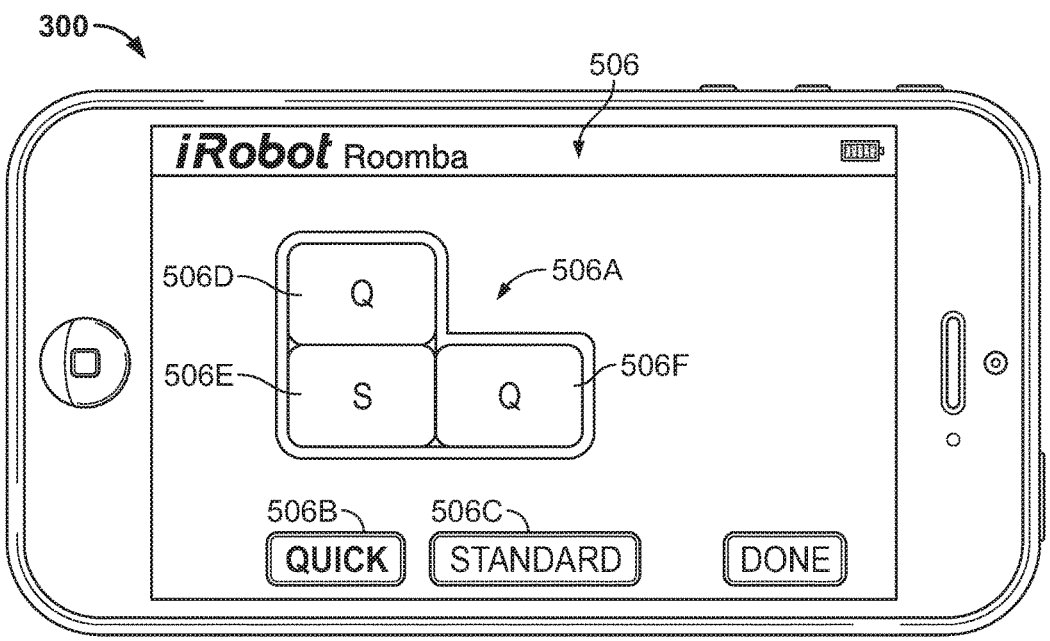

According to some embodiments, or according to the invention, the robot 200, in a given cleaning session, executes a lower cumulative energy cleaning strategy ("quick clean") in some areas of the coverage area and executes a higher cumulative energy cleaning strategy ("deep clean") in other areas of the coverage area. According to some embodiments or according to the invention, this multi-mode cleaning strategy includes combinations and permutations of one or more of the following:

a. The robot 200 sets the cleaning strategy for each area or region based on selected or prescribed focus criteria. The focus criteria may include the density or character of dirt collected by the robot 200 in the area.

b. The user, using the application on the device 300, sets the cleaning strategy based on selected or prescribed focus criteria.

c. The user, using the application on the device 300, sets the cleaning strategy for selected subregions or subsections of the area to be cleaned (e.g., different zones such as Zone A, Zone B and Zone C). With reference to FIG. 18, the application may provide an interface screen 506 including a graphical representation or map 506A of the area to be cleaned and cleaning strategy control elements (cleaning mode buttons 506B, 506C). The user can then use the cleaning mode buttons 506B, 506C to select the desired cleaning strategy and then select a region to be cleaned in this manner (e.g., by tracing around a selected area, touching the interior of a designated region 506D-F, or selecting a designated region from a list or the like). The map 506A and designated regions 506D-F may be generated from the map data discussed above and the robot 200 may conduct the cleaning operation with reference to the map and localization with respect thereto.

d. The robot 200 may set the cleaning level based on the floor type it detects (e.g., quick cleaning of hard surface and deep cleaning of carpet).

e. The robot 200 may identify area rugs and execute a deeper cleaning strategy (e.g., more time) on them.

f. The robot 200 may associate bump or other proximity events with detected dirt ingestion events and, in response thereto, execute deeper cleaning. These combined conditions indicate the presence of edges.

In some embodiments, or in the invention, the robot 200 is provided with an onboard, user actuatable cleaning mode selection switch 274C (e.g., a button) that can be used to switch the robot 200 between the quick and deep/standard cleaning modes of operation. The robot 200 may include one or more lights 274A or other indicators to indicate its cleaning mode status (i.e., quick clean or deep clean). The robot 200 may emit an audible signal or signals (using the audio transducer 274B) to indicate its cleaning mode status (e.g., a quick beep for quick clean mode and a long beep for deep clean mode).

According to some embodiments, or according to the invention, the robot 200 or the application on the device 300 is configured to estimate the remaining time required for the robot 200 to complete its cleaning operation and to report the same to the user. In some embodiments, or in the invention, the robot 200 or the application can estimate and report the estimated time required for each cleaning mode in the alternative.

In some embodiments, or in the invention, the user can set (using the application on the device 300, for example) the time available and the area to be cleaned, and the robot 300 or application can determine the appropriate or preferred cleaning mode(s) (quick, deep, or multi-mode) based on these criteria. In some embodiments, or in the invention, the robot 300 or application optimizes the user's original input settings, and the user can then decide whether to adopt the recommendation or proceed with the original settings. In some embodiments, or in the invention, the recommended new settings are indicated by reconfiguring the control elements on the user interface as discussed above.

Some of the determinations discussed above may utilize data derived from sensors that monitor dirt accumulation or extraction from the surface. Examples of such sensors may include instantaneous sensors such as piezoelectric or optical dirt detectors 242C integrated with the robot 200. Also, as discussed above, some determinations may utilize the detected fullness level of the debris bin 242A as detected by the bin level sensor 242B.

The system may further be configured to provide operational messages to the user based on conditions sensed by the robot 200 and/or data collected or derived by the application (e.g., messages 528 and 506C in FIGS. 15 and 17). The operational messages may include robot status messages and/or inquiry messages. For example, the system may display on the device 300 "You should do a deep clean soon; quick shows that the amount of dirt is higher than average. Would you like to schedule a deep clean? When? You are not normally at home Tuesdays at 11—how about tomorrow at 11?"

In some embodiments, or in the invention, the application on the device 300 enables the user to input designated high traffic areas for corresponding cleaning by the robot 200. In some embodiments, or in the invention, the robot 200 is configured to discover or detect and identify high traffic areas automatically and programmatically.

In some embodiments, or in the invention, the application on the device 300 enables the user to select a cleaning pattern or patterns (e.g., spirals, back and forth, crosswise, or scrubbing) the user believes or has determined are preferable in some regard (e.g., better, quicker, or deeper).

The remote user terminals as disclosed herein (e.g., terminals 142 and 300) may be communication terminals configured to communicate over a wireless interface, and may be referred to as "wireless communication terminals" or "wireless terminals." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface. In some embodiments, or in the invention, the remote user terminals 142, 300 are mobile terminals that are portable. In some embodiments, or in the invention, the remote user terminals 142, 300 are handheld mobile terminals, meaning that the outer dimensions of the mobile terminal are adapted and suitable for use by a typical operator using one hand. According to some embodiments, or according to the invention, the total volume of the handheld mobile terminal is less than about 200 cc and, according to some embodiments, or according to the invention, the total volume of the handheld mobile terminal is less than about 100 cc.

Figure 19:
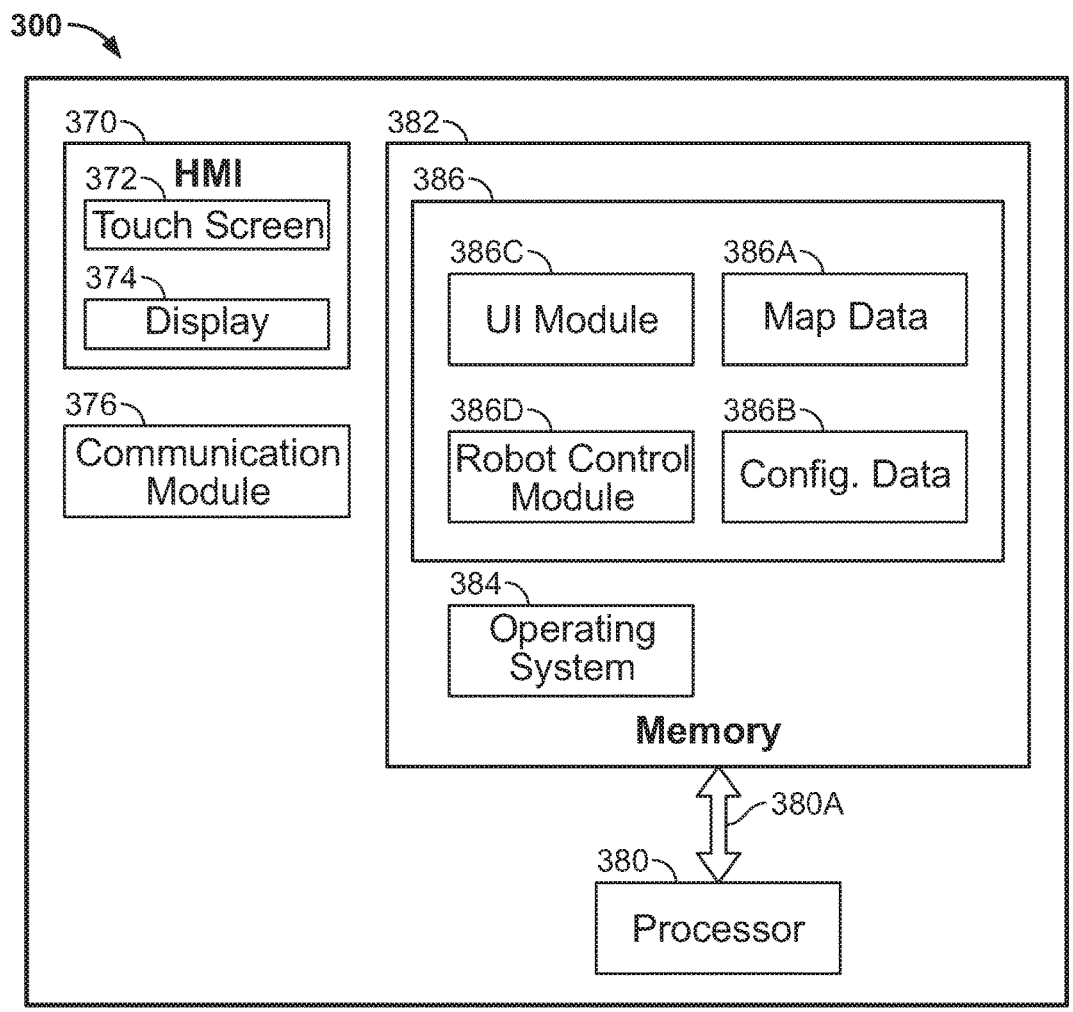
FIG. 19 is a schematic diagram of the user terminal of FIG. 1.

FIG. 19 is a schematic illustration of an exemplary user terminal that may be used as the user terminal 142 or 300 as discussed herein. The terminal 300 includes a human-machine interface (HMI) 370, a communication module, and a circuit or data processing system including a processor 380 and memory 382. The circuits and/or data processing systems may be incorporated in a digital signal processor. The processor 380 communicates with the HMI 370 and memory 382 via an address/data bus 380A. The processor 380 can be any commercially available or custom microprocessor. The memory 382 is representative of the overall hierarchy of memory devices containing the software and data used to implement the functionality of the data processing system. The memory 382 can include, but is not limited to, the following types of devices: cache, ROM, PROM, EPROM, EEPROM, flash memory, SRAM, and DRAM.

The memory 382 may include several categories of software and data used in the data processing system: the operating system 384; applications (including the robot control and monitoring application 386); and the input/output (I/O) device drivers. The application 386 includes mapping data 386A (e.g., corresponding to the coverage map and/or representing the positions of objects or boundaries in the living space), configuration data 386B (e.g., corresponding to the settings and configurations of the application 386 on the terminal 300 and the robot 200), a user interface (UI) module 386C and a robot control module 386D. The UI module 386C includes logic for generating the control elements and other displayed components on the display 374 and for receiving inputs from the user via the HMI 370 (e.g., via the touchscreen 372). The robot control module 386D includes logic for processing the user instructions and issuing commands to the robot 200 and receiving messages from the robot via a wireless communication module 376.

The display 374 may be any suitable display screen assembly. For example, the display screen 374 may be an active matrix organic light emitting diode display (AMOLED) or liquid crystal display (LCD) with or without auxiliary lighting (e.g., a lighting panel).

The HMI 370 may include, in addition to or in place of the touchscreen 372, any other suitable input device(s) including, for example, a touch activated or touch sensitive device, a joystick, a keyboard/keypad, a dial, a directional key or keys, and/or a pointing device (such as a mouse, trackball, touch pad, etc.).

The wireless communication module 376 may be configured to communicate data over one or more wireless interfaces as discussed herein to the robot transmitter 252, the hub wireless communication module 112, or other desired terminal. The communication module 32 can include a direct point-to-point connection module, a WLAN module, and/or a cellular communication module. A direct point-to-point connection module may include a direct RF communication module or a direct IR communication module. With a WLAN module, the wireless terminal 300 can communicate through a WLAN (e.g., a router) using a suitable communication protocol.

In some embodiments, or in the invention, the wireless terminal 300 is a mobile radiotelephone forming a part of a radiotelephone communication system.

As will be appreciated by those of skill in the art, other configurations may also be utilized while still benefiting from the teachings of the present technology. For example, one or more of the modules may be incorporated into the operating system, the I/O device drivers or other such logical division of the data processing system. Thus, the present technology should not be construed as limited to the configuration of FIG. 19, which is intended to encompass any configuration capable of carrying out the operations described herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more non-transitory computer readable media may be utilized. Non-transitory computer readable media comprises all computer readable media, with the exception of transitory, propagating signals. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure, or according to the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, or in the invention, and that modifications to the disclosed embodiments, as well as other embodiments, are intended to be included within the scope of the invention.

That which is claimed is:

1. An environmental management system for monitoring conditions in a living space of a structure, the environmental management system comprising:
   at least one processor configured to perform operations comprising:
   receiving stationary sensor data from a stationary sensor, the stationary sensor data indicative of one or more conditions in the living space;
   receiving robot sensor data from an onboard robot sensor of a mobile robot, the robot sensor data indicative of the one or more conditions in the living space, wherein the one or more conditions in the living space are controlled by one or more automation controller devices,
   evaluating the stationary sensor data and the robot sensor data to determine device usage data; and
   generating a usage report and energy management plan, the energy management plan comprising at least one automated control response for operating the one or more automation controller devices based on the stationary sensor data and the robot sensor data,
   wherein generating a usage report comprises using robot sensor data to monitor human occupancy behavior, and the energy management plan comprises the at least one automated control response for reducing energy consumption based on human occupancy behavior,
   wherein the processor is further configured to determine whether the at least one automated control response is completed based on robot sensor data.

2. A method for monitoring conditions in a living space of a structure, the method comprising:
   receiving stationary sensor data from a stationary sensor, the stationary sensor data indicative of one or more conditions in the living space;
   receiving robot sensor data from an onboard robot sensor of a mobile robot, the robot sensor data indicative of the one or more conditions in the living space, wherein the one or more conditions in the living space are controlled by automation controller devices;
evaluating the stationary sensor data and the robot sensor data to determine device usage;
generating a usage report and energy management plan, the energy management plan comprising at least one automated control response for operating the one or more automation controller devices based on the stationary sensor data and the robot sensor data, and
determining whether the at least one automated control response is completed based on robot sensor data;
wherein generating a usage report comprises using robot sensor data to monitor human occupancy behavior, and the energy management plan comprises at least one automated control response for reducing energy consumption based on human occupancy behavior.

3. A system for monitoring and controlling mobile robot status in a living space of a structure, comprising:
at least one processor configured to perform operations comprising:
receiving robot sensor data from an onboard sensor of a mobile robot to monitor the robot sensor data indicative of one or more conditions in the living space, wherein the one or more conditions in the living space are controlled by automation controller devices;
controlling the mobile robot by providing one or more selectable scheduling parameters or action commands;
monitoring a state of the mobile robot by providing a display of area coverage completion;
evaluating the robot sensor data to determine device usage data; and
generating a usage report and energy management plan, the energy management plan comprising at least one automated control response for operating the one or more automation controller devices based on the stationary sensor data and the robot sensor data,
wherein generating a usage report comprises using robot sensor data to monitor human occupancy behavior, and the energy management plan comprises at least one automated control response for reducing energy consumption based on human occupancy behavior, wherein the processor is further configured to determine whether the at least one automated control response is completed based on robot sensor data.

4. The environmental management system of claim 1 further comprising:
a hub in communication with a network and configured to receive the stationary sensor data and the robot sensor data;
the environmental management system includes a remote user terminal in communication with the network; and
the environmental management system is configured to transmit robot sensor data from the mobile robot to the remote user terminal via the network.

5. The environmental management system of claim 4 wherein:
the mobile robot is configured to wirelessly communicate directly with the hub; and
the hub is configured to relay the robot sensor data to the remote user terminal via the network.

6. The environmental management system of claim 4 wherein the hub includes an integral environmental sensor.

7. The environmental management system of claim 4 wherein the hub includes an integral automation controller device.

8. The environmental management system of claim 4 wherein the hub is a networked, microprocessor controlled thermostat including an integral ambient temperature sensor and an integral HVAC controller.

9. The environmental management system of claim 1 wherein the environmental management system is configured to deploy the mobile robot to collect environmental data from the living space in response to the stationary sensor data.

10. The environmental management system of claim 9 wherein:
the stationary sensor is configured to detect the presence of an occupant in the living space; and
the environmental management system is configured to deploy the mobile robot to collect environmental data from the living space in response to the stationary sensor data indicating that an occupant is present in the living space.

11. The environmental management system of claim 10 wherein the stationary sensor includes a motion sensor.

12. The environmental management system of claim 9 wherein:
the stationary sensor is configured to detect the opening of a door or window of the living space; and
the environmental management system is configured to deploy the mobile robot to collect environmental data from the living space in response to the stationary sensor data indicating that the door or window is open.

13. The environmental management system of claim 12 wherein the stationary sensor includes a contact sensor.

14. The environmental management system of claim 9 wherein:
the robot sensor is a camera;
the environmental management system includes a remote user terminal;
the stationary sensor is configured to detect the presence of an occupant or the opening of a door or window in the living space; and
the mobile robot is operative to send an image of the living space from the camera to the remote user terminal.

15. The environmental management system of claim 1 wherein:
the environmental management system includes a remote user terminal; and
the environmental management system is configured to deploy the mobile robot to collect environmental data from the living space in response to instructions from the user via the remote user terminal.

16. The environmental management system of claim 15 wherein:
the robot sensor is a camera; and
the mobile robot is operative to send an image of the living space from the camera to the remote user terminal.

17. The environmental management system of claim 1 wherein:
the environmental management system includes a remote user terminal;
the robot sensor is an ambient temperature sensor;
the environmental management system is operative to localize the mobile robot in the living space, generate a map of the living space, register the position of the mobile robot relative to the living space, and collect a temperature data set from the ambient temperature sensor representing a temperature distribution in the living space; and the environmental management system is operative to report the temperature distribution to the remote user terminal.

18. The environmental management system of claim 1 wherein the robot sensor is operative to detect an open door or window of the living space.

19. The environmental management system of claim 1 wherein the robot sensor is operative to detect an occupant in the living space.

20. The environmental management system of claim 1 wherein the robot sensor is a microphone.

21. The environmental management system of claim 1 wherein at least one of the automation controller devices includes an automatic latch or lock device.

22. The environmental management system of claim 1, wherein the processor is configured to generate an energy management plan comprising a recommended plan for operating or deploying energy management equipment.

23. The environmental management system of claim 1, wherein the processor is configured to generate an energy management plan in response to device usage data comprising on/off status data of the device(s).

24. The environmental management system of claim 1, wherein at least one of the automation controller devices includes a device operative to open and close a window cover, a thermostat to control an HVAC system, an automatic latch or lock device, or a switch device to actuate/deactuate a light.

25. The environmental management system of claim 1, wherein the usage report comprises a pattern of device usage, and the energy management plan comprises a plan for operating or deploying energy management equipment based on the pattern of device usage.

26. The environmental management system of claim 1, wherein the at least one automated control response comprises turning off a light, and the processor is further configured to determine whether the at least one automated control response is completed based on whether the robot sensor data indicates that the light is off.

27. The environmental management system of claim 1, wherein the at least one automated controller response comprises automatically actuating a controller to close or open a window shade, and the processor is further configured to determine whether the at least one automated control response is completed based on whether the robot sensor data indicates that the window shade is closed or opened.

28. The method of claim 2 further comprising:
localizing the mobile robot in the living space,
generating a map of the living space,
registering the position of the mobile robot relative to the living space, and
collecting a temperature data set from an ambient temperature sensor representing a temperature distribution in the living space from the robot sensor, the robot sensor comprising an ambient temperature sensor; and
reporting the temperature distribution to a remote user terminal.

29. The method of claim 2 further comprising deploying the mobile robot to collect environmental data from the living space in response to the stationary sensor data.

30. The method of claim 2 further comprising generating an energy management plan in response to device usage data comprising on/off status data of the automated controller device(s).

31. The system of claim 3 wherein the robot sensor is an ambient temperature sensor; the at least one processor being further configured to localize the mobile robot in the living space, generate a map of the living space, register the position of the mobile robot relative to the living space, and collect a temperature data set from the ambient temperature sensor representing a temperature distribution in the living space; and to report the temperature distribution to a remote user terminal.

32. The system of claim 3 wherein the processor is further configured to deploy the mobile robot to collect environmental data from the living space in response to the stationary sensor data.

33. The system of claim 3 wherein the processor is further configured to generate an energy management plan in response to device usage data comprising on/off status data of the automated controller device(s).

* * * * *